United States Patent [19]

US 12,452,343 B2

Kesack et al.

(10) Patent No.: US 12,452,343 B2
(45) Date of Patent: Oct. 21, 2025

(54) SYSTEMS AND METHODS FOR DYNAMICALLY GENERATING EVENT CARDS FROM MESSAGE STREAMS

(71) Applicant: DK Crown Holdings Inc., Boston, MA (US)

(72) Inventors: Daniel Kesack, Ipswich, MA (US); William Hester, Boston, MA (US); Jessie Haffey, Somerville, MA (US); Jonathan Nguyen, Cambridge, MA (US)

(73) Assignee: DK Crown Holdings Inc., Boston, MA (US)

( * ) Notice: Subject to any disclaimer, the term of this patent is extended or adjusted under 35 U.S.C. 154(b) by 48 days.

(21) Appl. No.: 18/094,911

(22) Filed: Jan. 9, 2023

(65) Prior Publication Data

US 2023/0158407 A1  May 25, 2023

Related U.S. Application Data

(63) Continuation of application No. 16/994,942, filed on Aug. 17, 2020, now Pat. No. 11,547,940, which is a
(Continued)

(51) Int. Cl.
*A63F 13/46* (2014.01)
*A63F 13/355* (2014.01)
(Continued)

(52) U.S. Cl.
CPC ............ *H04L 67/55* (2022.05); *A63F 13/355* (2014.09); *A63F 13/46* (2014.09); *A63F 13/65* (2014.09);
(Continued)

(58) Field of Classification Search
None
See application file for complete search history.

(56) References Cited

U.S. PATENT DOCUMENTS 9,003,294 B1  4/2015 Ames et al.
10,744,413 B2 * 8/2020 Kesack ................... H04W 4/21
(Continued)

OTHER PUBLICATIONS

Final Office Action on U.S. Appl. No. 16/123,730 dated Aug. 21, 2020.
(Continued)

*Primary Examiner* — Damon J Pierce
(74) *Attorney, Agent, or Firm* — Foley & Lardner LLP

(57) ABSTRACT

Systems and methods for dynamically generating event cards from message streams is provided. A system receives a message of a sequence of messages from a content source, determine, from the message, the game condition of the game, compare the game condition with a previous game condition and determines events that occurred in the game based on the message and the comparison. The system can determine, for each event of the one or more events, an event type and individual player contributions of one or more players and assign, for each event of the one or more events, to each player that contributed in the event, a points allocation corresponding to the player's contribution in the event based on the points assignment policy and the event type. The system can generate event cards and transmit the event cards to emote devices according to a content filtering policy.

14 Claims, 23 Drawing Sheets

Related U.S. Application Data continuation of application No. 16/123,740, filed on Sep. 6, 2018, now Pat. No. 10,744,413.

(60) Provisional application No. 62/555,600, filed on Sep. 7, 2017, provisional application No. 62/555,606, filed on Sep. 7, 2017.

(51) Int. Cl.

| | |
|---|---|
| *A63F 13/65* | (2014.01) |
| *A63F 13/828* | (2014.01) |
| *H04L 67/141* | (2022.01) |
| *H04L 67/55* | (2022.01) |
| *H04W 4/18* | (2009.01) |
| *H04W 4/21* | (2018.01) |
| *G06F 40/106* | (2020.01) |
| *H04L 67/01* | (2022.01) |
| *H04L 67/02* | (2022.01) |

(52) U.S. Cl.
CPC .......... *A63F 13/828* (2014.09); *H04L 67/141* (2013.01); *H04W 4/18* (2013.01); *H04W 4/21* (2018.02); *G06F 40/106* (2020.01); *H04L 67/01* (2022.05); *H04L 67/02* (2013.01)

(56) References Cited

U.S. PATENT DOCUMENTS

| | | | |
|---|---|---|---|
| 11,547,940 B2* | 1/2023 | Kesack | .................. A63F 13/65 |
| 11,654,361 B2 | 5/2023 | Nguyen et al. | |
| 2007/0021165 A1 | 1/2007 | Ma et al. | |
| 2008/0026804 A1* | 1/2008 | Baray | .................. A63F 13/795 |
| | | | 463/9 |
| 2013/0060361 A1 | 3/2013 | Gabrail et al. | |
| 2013/0158688 A1* | 6/2013 | Barber | ................. H04N 21/458 |
| | | | 700/91 |
| 2013/0158984 A1 | 6/2013 | Myslinski | |
| 2013/0282839 A1 | 10/2013 | Alcala | |
| 2014/0018135 A1 | 1/2014 | Fernandez et al. | |
| 2016/0255409 A1 | 9/2016 | Feldstein et al. | |
| 2016/0271501 A1 | 9/2016 | Balsbaugh | |
| 2017/0115857 A1 | 4/2017 | Hughes et al. | |
| 2020/0162796 A1 | 5/2020 | Azuolas et al. | |

OTHER PUBLICATIONS

Final Office Action on U.S. Appl. No. 16/994,942 dated May 24, 2022.

Non-Final Office Action in U.S. Appl. No. 16/123,740, dated Nov. 29, 2019.

Non-Final Office Action on U.S. Appl. No. 16/123,730, dated Mar. 30, 2020.

Non-Final Office Action on U.S. Appl. No. 16/994,942 dated Jan. 28, 2022.

Non-Final Office Action on U.S. Appl. No. 16/994,942 dated Sep. 21, 2021.

Non-Final Office Action on U.S. Appl. No. 17/333,988 dated Sep. 12, 2022.

Notice of Allowance for U.S. Appl. No. 16/123,740, dated Apr. 14, 2020.

Notice of Allowance on U.S. Appl. No. 16/994,942 dated Sep. 15, 2022.

Notice of Allowance on U.S. Appl. No. 16/123,730 dated Feb. 4, 2021.

Notice of Allowance on U.S. Appl. No. 17/333,988 dated Jan. 17, 2023.

Non-Final Office Action on U.S. Appl. No. 18/300,902 Dtd Apr. 29, 2024.

Notice of Allowance on U.S. Appl. No. 18/300,902 dated Oct. 9, 2024.

* cited by examiner

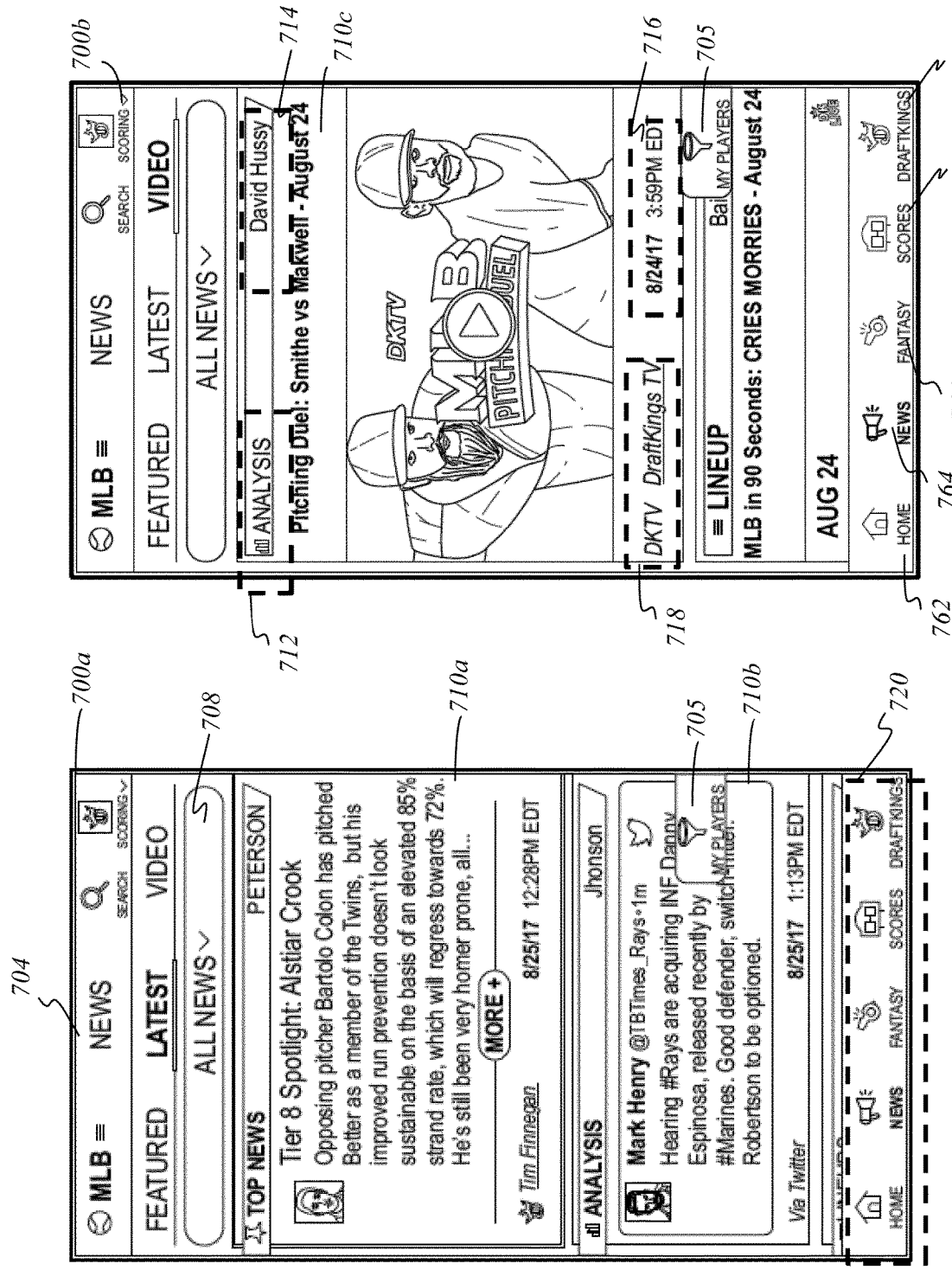

SYSTEMS AND METHODS FOR DYNAMICALLY GENERATING EVENT CARDS FROM MESSAGE STREAMS

CROSS-REFERENCE TO RELATED APPLICATIONS

The present application is a continuation of, and claims the benefit of priority to U.S. patent application Ser. No. 16/994,942, titled "SYSTEMS AND METHODS FOR DYNAMICALLY GENERATING EVENT CARDS FROM MESSAGE STREAMS," filed Aug. 17, 2020, which itself is a continuation of, and claims the benefit of priority to U.S. patent application Ser. No. 16/123,740, titled "SYSTEMS AND METHODS FOR DYNAMICALLY GENERATING EVENT CARDS FROM MESSAGE STREAMS", filed on Sep. 6, 2018, now U.S. Pat. No. 10,744,413, which claims the benefit of priority under 35 U.S.C. § 119(e) to U.S. Provisional Application 62/555,606, titled "SYSTEMS AND METHODS FOR DYNAMICALLY GENERATING EVENT CARDS FROM MESSAGE STREAMS", filed on Sep. 7, 2017, and claims the benefit of priority under 35 U.S.C. § 119(e) to U.S. Provisional Application 62/555,600, titled "SYSTEMS AND METHODS FOR PRIORITIZING CONTENT PACKETS BASED ON A DYNAMICALLY UPDATED LIST OF CONTENT FILTERING RULES", filed on Sep. 7, 2017. The entire disclosures of each are incorporated herein by reference in their entirety.

BACKGROUND OF THE DISCLOSURE

Content management systems allocate and use a lot of computing resources to transmit content to a very large number of remote computing devices. Similarly, remote computing devices also allocate and use a lot of computing resources to receive and display the content received from the content management systems. In the case of mobile devices where memory, processing power and power are all finite resources, the receipt and display of content that is not contextually relevant to a user can adversely affect the device's performance and life as well the overall user experience. As such, content management systems should utilize appropriate resource management policies to reduce the amount of contextually irrelevant content being delivered to the remote computing devices.

BRIEF SUMMARY OF THE DISCLOSURE

Systems and methods of the present solution are directed to dynamically generating event cards from message streams. According to one aspect, a method for dynamically generating event cards from message streams is provided. The method includes receiving, by an event generation system including one or more processors, a message of a sequence of messages from a content source. Each message of the sequence of messages is received at least a predetermined amount of time after a preceding message. The message can include identifying information relating to a game condition of a game. The method includes determining, by the event generation system, from the message, a game condition of the game. The method includes comparing by the event generation system, the game condition of the game with a previous game condition of the game determined based on a message preceding the message. The method includes determining, by the event generation system, one or more events that occurred in the game based on the content of the message and the comparison. The method includes determining, by the event generation system, for each event of the one or more events, an event type and individual player contributions of one or more players. The method includes assigning, by the event generation system, for each event of the one or more events, to each player that contributed in the event, a points allocation corresponding to the player's contribution in the event based on the points assignment policy and the event type. The method includes generating, by the event generation system, for the events for which points allocation were assigned to at least one player, respective event cards including i) a game identifier identifying the game, ii) a game condition at a first time, iii) the event type of the event, iv) one or more players identifiers identifying the players that were assigned a points allocation, and v) a number of points in the points allocation that was assigned to each of the players that were assigned a points allocation. The method includes transmitting, by the event generation system, at least one of the generated event cards to one or more remote devices for display in a content feed including a plurality of event cards corresponding to the game.

In some embodiments, the method includes identifying, by the event generation system, a player list associated with a user of the event generation system. The player list includes a list of players the user has selected in one or more fantasy sports lineups submitted to a fantasy sports system. The method includes determining, by the event generation system, that a first event card of the generated event cards identifies a player included in the player list of the user. The method includes transmitting, by the event generation system, the first event card to a remote device of the user responsive to determining that the player identified in the first event card is included in the player list of the user.

In some embodiments, the method includes determining, by the event generation system, that a second event card of the generated event cards does not identify any player included in the player list of the user. The method includes restricting, by the event generation system, transmission of the second event card to the remote device of the user responsive to determining that the second event card of the generated event cards does not identify any player included in the player list of the user.

In some embodiments, the method includes maintaining, by the event generation system, for each player, a points tally identifying a total number of points allocated to the player in the game. The method includes updating, by the event generation system, for each player to which points were assigned based on the one or more events identified in the message, the points tally by adjusting the points tally based on the amount of points assigned to the player for the one or more events identified in the message.

In some embodiments, the message is a first message and wherein the method further includes receiving, by the event generation system, a second message of the sequence of messages subsequent to the first message from the content source, the second message identifying information relating to a new game condition of a game. The method also includes determining, by the event generation system, from the second message, the new game condition of the game. The method also includes comparing by the event generation system, the game condition of the game with a previous game condition of the game determined based on the first message. The method also includes determining, by the event generation system, one or more events that occurred in the game based on the content of the second message and the comparison. The method also includes determining, by the event generation system, for each event of the one or more events relating to the second message, an event type and individual player contributions of one or more players. The method also includes assigning, by the event generation system, for each event of the one or more events relating to the second message, to each player that contributed in the event, a points allocation corresponding to the player's contribution in the event based on the points assignment policy and the event type. The method also includes generating, by the event generation system, respective event cards for the events for which points allocation were assigned to at least one player. The method also includes transmitting, by the event generation system, at least one of the generated event cards to a subset of the one or more remote devices subsequent to transmitting the event cards corresponding to the first message.

In some embodiments, the method can include executing, by the event generation system, an event algorithm using time based data from the message of a sequence of messages from a content source, determining, by the event generation system using the event algorithm, one or more data points that changed value responsive to the time based data, the one or more data points corresponding to at least one event of the one or more events, and converting, by the event generation system using the event algorithm, the time based data to event based data corresponding to the at least one event of the one or more events.

The method can include determining, by the event generation system, that a first event card of the generated event cards identifies a player included in a player list of a user of the event generation system, and dynamically updating the content feed of at least one remote device of the user with the first event card.

In some embodiments, the method can include dynamically updating the content feed of at least one remote device of the first user with the first event card, and dynamically updating the content feed of at least one remote device of the second user with the first event card.

The message can be a first message and the method can include receiving, by the event generation system, a second message of the sequence of messages subsequent to the first message from the content source, the second message identifying information relating to a new game condition of the game, dynamically modifying the number of points in the points allocation assigned to a first player that contributed in the event responsive to the second message, and dynamically modifying the number of points in the points allocation assigned to a second player that contributed in the event responsive to the second message.

In some embodiments, the message can be a first message and the method can include dynamically modifying the game condition of a first event card for a first user event generation system responsive to a second message of the sequence of messages, and dynamically modifying the game condition of the first event card for the first user event generation system responsive to a third message of the sequence of messages, the third message subsequent to the second message of the sequence of messages.

According to another aspect, a system for dynamically generating event cards from message streams includes an event generation system including one or more processors configured to receive a message of a sequence of messages from a content source. Each message of the sequence of messages is received at least a predetermined amount of time after a preceding message. The message identifies information relating to a game condition of a game. The one or more processors are further configured to determine, from the message, the game condition of the game, compare the game condition of the game with a previous game condition of the game determined based on a message preceding the message and determine one or more events that occurred in the game based on the content of the message and the comparison. The one or more processors are further configured to determine, for each event of the one or more events, an event type and individual player contributions of one or more players. The one or more processors are further configured to assign, for each event of the one or more events, to each player that contributed in the event, a points allocation corresponding to the player's contribution in the event based on the points assignment policy and the event type. The one or more processors are further configured to generate, for the events for which points allocation were assigned to at least one player, respective event cards including i) a game identifier identifying the game, ii) a game condition, iii) the event type of the event, iv) one or more players identifiers identifying the players that were assigned a points allocation, and v) a number of points in the points allocation that was assigned to each of the players that were assigned a points allocation and transmit at least one of the generated event cards to one or more remote devices for display in a content feed including a plurality of event cards corresponding to the game.

In some embodiments, the event generation system can be further configured to identify a player list associated with a user of the event generation system, the player list including a list of players the user has selected in one or more fantasy sports lineups submitted to a fantasy sports system, determine that a first event card of the generated event cards identifies a player included in the player list of the user, and transmit the first event card to a remote device of the user responsive to determining that the player identified in the first event card is included in the player list of the user.

The event generation system can be further configured to determine, that a second event card of the generated event cards does not identify any player included in the player list of the user, and restrict transmission of the second event card to the remote device of the user responsive to determining that the second event card of the generated event cards does not identify any player included in the player list of the user.

In some embodiments, the event generation system can be further configured to maintain, for each player, a points tally identifying a total number of points allocated to the player in the game, and update, for each player to which points were assigned based on the one or more events identified in the message, the points tally by adjusting the points tally based on the amount of points assigned to the player for the one or more events identified in the message.

The message can be a first message and the event generation system can be further configured to receive a second message of the sequence of messages subsequent to the first message from the content source, the second message identifying information relating to a new game condition of a game, determine, from the second message, the new game condition of the game, compare the game condition of the game with a previous game condition of the game determined based on the first message, determine one or more events that occurred in the game based on the content of the second message and the comparison, determine, for each event of the one or more events relating to the second message, an event type and individual player contributions of one or more players, assign, for each event of the one or more events relating to the second message, to each player that contributed in the event, a points allocation corresponding to the player's contribution in the event based on the points assignment policy and the event type, generate, respective event cards for the events for which points allocation were assigned to at least one player, and transmit at least one of the generated event cards to a subset of the one or more remote devices subsequent to transmitting the event cards corresponding to the first message.

In some embodiments, the event generation system can be further configured to determine that a first event card of the generated event cards identifies a player included in a player list of a user of the event generation system and dynamically update the content feed of at least one remote device of the user with the first event card.

The event generation system can be further configured to execute an event algorithm using time based data from the message of a sequence of messages from a content source, determine, using the event algorithm, one or more data points that changed value responsive to the time based data, the one or more data points corresponding to at least one event of the one or more events, and convert, using the event algorithm, the time based data to event based data corresponding to the at least one event of the one or more events.

In some embodiments, the event generation system can be further configured to dynamically update the content feed of at least one remote device of the first user with the first event card, and dynamically update the content feed of at least one remote device of the second user with the first event card.

The message can be a first message and the event generation system can be further configured to receive a second message of the sequence of messages subsequent to the first message from the content source, the second message identifying information relating to a new game condition of the game, dynamically modify the number of points in the points allocation assigned to a first player that contributed in the event responsive to the second message, and dynamically modify the number of points in the points allocation assigned to a second player that contributed in the event responsive to the second message.

The message can be a first message and the event generation system can be further configured to dynamically modify the game condition of a first event card for a first user event generation system responsive to a second message of the sequence of messages, and dynamically modify the game condition of the first event card for the first user event generation system responsive to a third message of the sequence of messages, the third message subsequent to the second message of the sequence of messages.

In some embodiments, systems and methods of the present solution can be directed to prioritizing content packets based on a dynamically updated list of content filtering rules. According to one aspect, a method for prioritizing content packets based on a dynamically updated list of content filtering rules includes identifying, by a server including one or more processors, an application executing on a client device to which to transmit content. The application is associated with an account. The method further includes determining, by the server, that the application is configured with a configuration setting to apply a content filtering policy corresponding to a list of players including one or more players included in one or more lineups associated with the account. The method further includes receiving, by the server, a content item from a content source. The method further includes determining, by the server, one or more player tags associated with the content item, the player tags identifying one or more players with which the content item is associated. The method further includes determining, by the server, that the content item includes a player tag corresponding to a player included in the list of players corresponding to the application. The method further includes transmitting, by the server, the content item to the client device for insertion in a content feed provided by the application responsive to determining that content item includes the player tag corresponding to a player included in the list of players corresponding to the application.

In some embodiments, the method further includes establishing, by the server, a web socket connection between the server and the application executing on the device and maintaining state information of the web socket connection and wherein transmitting the content item to the client device includes transmitting the content item to the client device responsive to determining that the web socket connection is active.

In some embodiments, the method further includes storing a request to transmit the content item in a queue responsive to determining that there is no active web socket connection between the server and the application, determining that a web socket connection between the server and the application has been established, and transmitting the content item to the client device responsive to determining that the web socket connection between the server and the application has been established.

In some embodiments, the method further includes maintaining, by the server, the list of players associated with the account, and updating, by the server, the list of players responsive to a user of the account modifying an existing lineup or adding a new lineup.

In some embodiments, the method further includes determining, by the server, that a second player has been added to the list of players associated with the account, identifying a second content item including a second player tag corresponding to the second player, adding the second content item to a queue of content items to transmit to the application, and transmitting the second content item to the client device for presentation in the content feed of the application responsive to determining that there is a connection between the server and the application executing on the client device.

In some embodiments, the method further includes determining, by the server, that a lineup including a set of players associated with the account has expired, removing, by the server, at least one of the set of players from the list of players associated with the account responsive to determining that the lineup has expired, identifying a second content item including a second player tag that corresponds to the at least one player of the set of players that was removed from the list of players, and removing the second content item from a queue of content items to transmit to the application responsive to removing the at least player from the list of players.

In some embodiments, the application is configured to display an actionable item that when selected, applies the content filtering policy to filter the content displayed in the content feed of the application based on the list of players included in the one or more lineups associated with the account.

In some embodiments, the content item is a first content item and wherein the method further includes receiving the first content item from a first content source in a first content format, selecting, from a plurality of content modification policies, a first content modification policy to modify the format of the first content item from the first content format to a second content format that the application executing on the client device is configured to present in the content feed, formatting the first content item from the first content format to the second content format, and storing the first content item in the second content format, and wherein transmitting the first content item includes transmitting the first content item in the second content format for display in the content feed provided by the application.

In some embodiments, the method further includes receiving a second content item from a second content source in a third content format, selecting, from a plurality of content modification policies, a second content modification policy to modify the format of the first content item from the third content format to a fourth content format that the application executing on the client device is configured to present in the content feed, formatting the second content item from the third content format to the fourth content format, storing the second content item in the fourth content format, and transmitting the second content item to the client device in the fourth content format for display in the content feed provided by the application.

According to another aspect, a system for dynamically updating a packet transmission queue, includes a server including one or more processors configured to identify an application executing on a client device to which to transmit content. The application is associated with an account, determine that the application is configured with a configuration setting to apply a content filtering policy corresponding to a list of players including one or more players included in one or more lineups associated with the account. The system is further configured to receive a content item from a content source, determine one or more player tags associated with the content item. The player tags identify one or more players with which the content item is associated. The system is further configured to determine that the content item includes a player tag corresponding to a player included in the list of players corresponding to the application. The system is further configured to transmit the content item to the client device for insertion in a content feed provided by the application responsive to determining that the content item includes the player tag corresponding to a player included in the list of players corresponding to the application.

In some embodiments, the server can be further configured to establish a web socket connection between the server and the application executing on the device and maintain state information of the web socket connection. To transmit the content item to the client device, the server can be configured to transmit the content item to the client device responsive to determining that the web socket connection is active. The server can be configured to store a request to transmit the content item in a queue responsive to determining that there is no active web socket connection between the server and the application, determine that a web socket connection between the server and the application has been established, and transmit the content item to the client device responsive to determining that the web socket connection between the server and the application has been established.

The server can be configured to maintain the list of players associated with the account; and update the list of players responsive to a user of the account modifying an existing lineup or adding a new lineup. In some embodiments, the server can be configured to determine that a second player has been added to the list of players associated with the account, identify a second content item including a second player tag corresponding to the second player, add the second content item to a queue of content items to transmit to the application, and transmit the second content item to the client device for presentation in the content feed of the application responsive to determining that there is a connection between the server and the application executing on the client device.

In some embodiments, the server can be configured to determine that a lineup including a set of players associated with the account has expired, remove at least one of the set of players from the list of players associated with the account responsive to determining that the lineup has expired, identify a second content item including a second player tag that corresponds to the at least one player of the set of players that was removed from the list of players, and remove the second content item from a queue of content items to transmit to the application responsive to removing the at least player from the list of players. The application can be configured to display an actionable item that when selected and apply the content filtering policy to filter the content displayed in the content feed of the application based on the list of players included in the one or more lineups associated with the account.

In some embodiments, the content item can be a first content item and the server can be further configured to receive the first content item from a first content source in a first content format, select, from a plurality of content modification policies, a first content modification policy to modify the format of the first content item from the first content format to a second content format that the application executing on the client device is configured to present in the content feed, format the first content item from the first content format to the second content format, and store the first content item in the second content format. To transmit the first content item, the server can be configured to transmit the first content item in the second content format for display in the content feed provided by the application. The server can be configured to receive a second content item from a second content source in a third content format, select, from a plurality of content modification policies, a second content modification policy to modify the format of the first content item from the third content format to a fourth content format that the application executing on the client device is configured to present in the content feed, format the second content item from the third content format to the fourth content format, store the second content item in the fourth content format, and transmit the second content item to the client device in the fourth content format for display in the content feed provided by the application.

According to another aspect, a method for updating a ranking of content items according to a dynamic content filtering policy includes maintaining, by a server including one or more processors, a queue of content items to transmit to a device associated with a user of a fantasy sports system. The queue of content items includes a plurality of content items. Each content item is tagged with a label identifying a player included in one or more fantasy sports lineups created by the user for one or more contests provided by the fantasy sports system. Each content item in the queue of content items is ranked according to an order in which the server will transmit the content item to the device associated with the user. The method further includes maintaining, by the server, for the user, a list of players included in the one or more fantasy sports lineups created by the user. The list of players includes players that are on fantasy sports lineups for contests that have not yet been completed. The method further includes monitoring, by the server, for updates to the one or more contests provided by the fantasy sports system. The method further includes determining, by the server, that a contest of the one or more contests has been completed. The method further includes determining, by the server, for at least one player included in the list of players, that the player is not included in any other fantasy sports lineup of the user for contests that have not yet been completed. The method further includes removing, by the server, the player from the list of players responsive to determining the player is not included in any other fantasy sports lineup of the user for contests that have not yet been completed. The method further includes identifying, by the server, at least one content item in the queue of content items that is tagged with a label identifying the player that is removed from the list of player, and updating, by the server, rankings of the content items included in the queue of content items by changing a rank of the content item in the queue of content items. The method further includes updating the rankings of the content items included in the queue of content items by changing the rank of the content item in the queue of content items includes removing the content item from the queue of content items. In some embodiments, the method can include updating the rankings of the content items included in the queue of content items by changing the rank of the content item in the queue of content items includes removing the content item from the queue of content items.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 7A-7D are screenshots of user interfaces of the application shown in FIG. 2.

FIGS. 13A-13F are screenshots of user interfaces of the application shown in FIG. 2 generated using information provided by the event generation system shown in FIG. 8; and FIGS. 14A-14J are screenshots of user interfaces of the application shown in FIG. 2 generated using information provided by the event generation system shown in FIG. 8.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for prioritizing content packets based on a dynamically updated list of content filtering rules.

Section C describes embodiments of systems and methods for dynamically generating event cards from message streams.

A. Computing and Network Environment

Figure 1A:
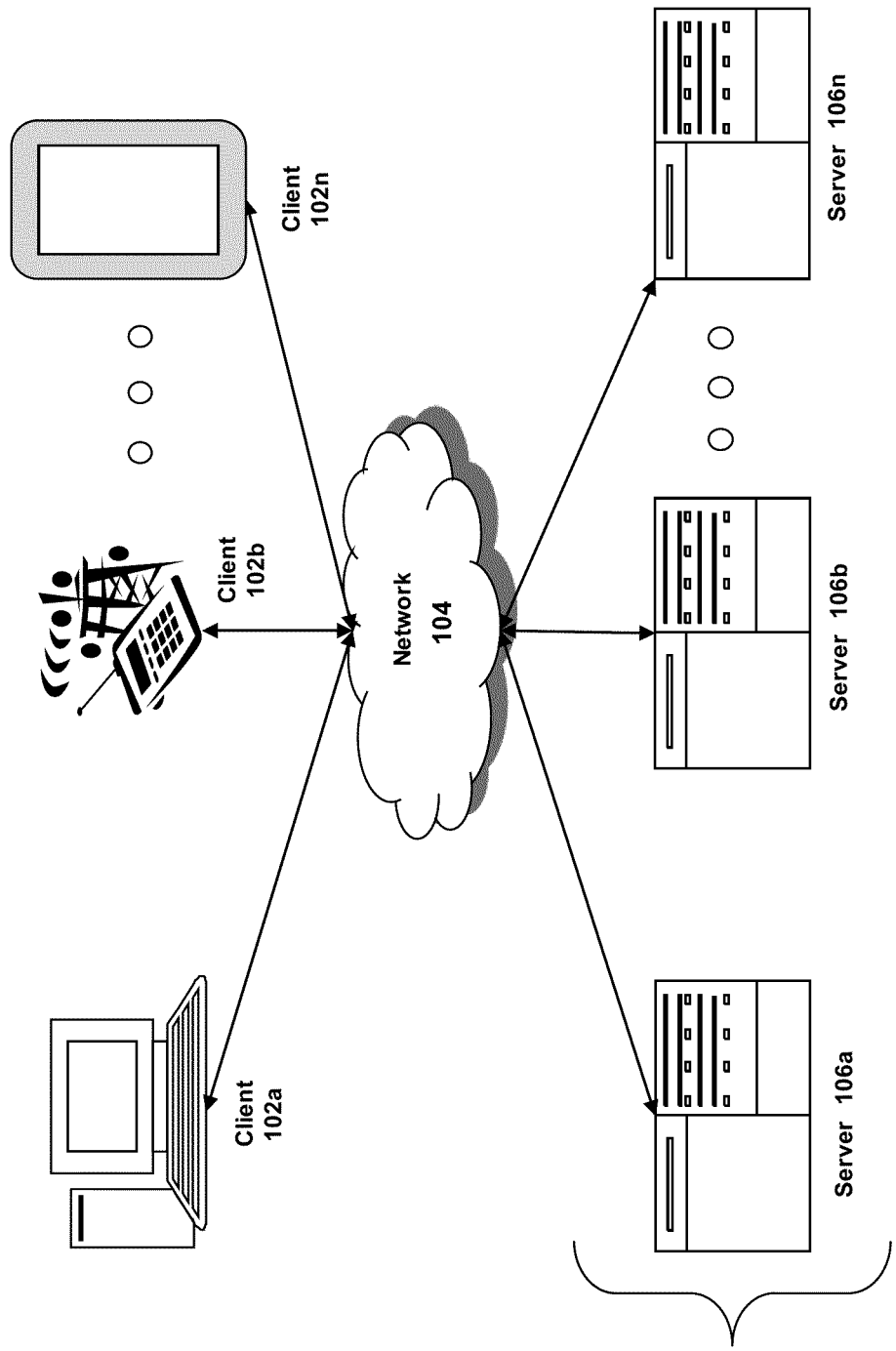
FIG. 1A is a block diagram depicting an embodiment of a network environment comprising client devices in communication with server devices via a network.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2050 (IMT-2050) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node.

Figure 1B:
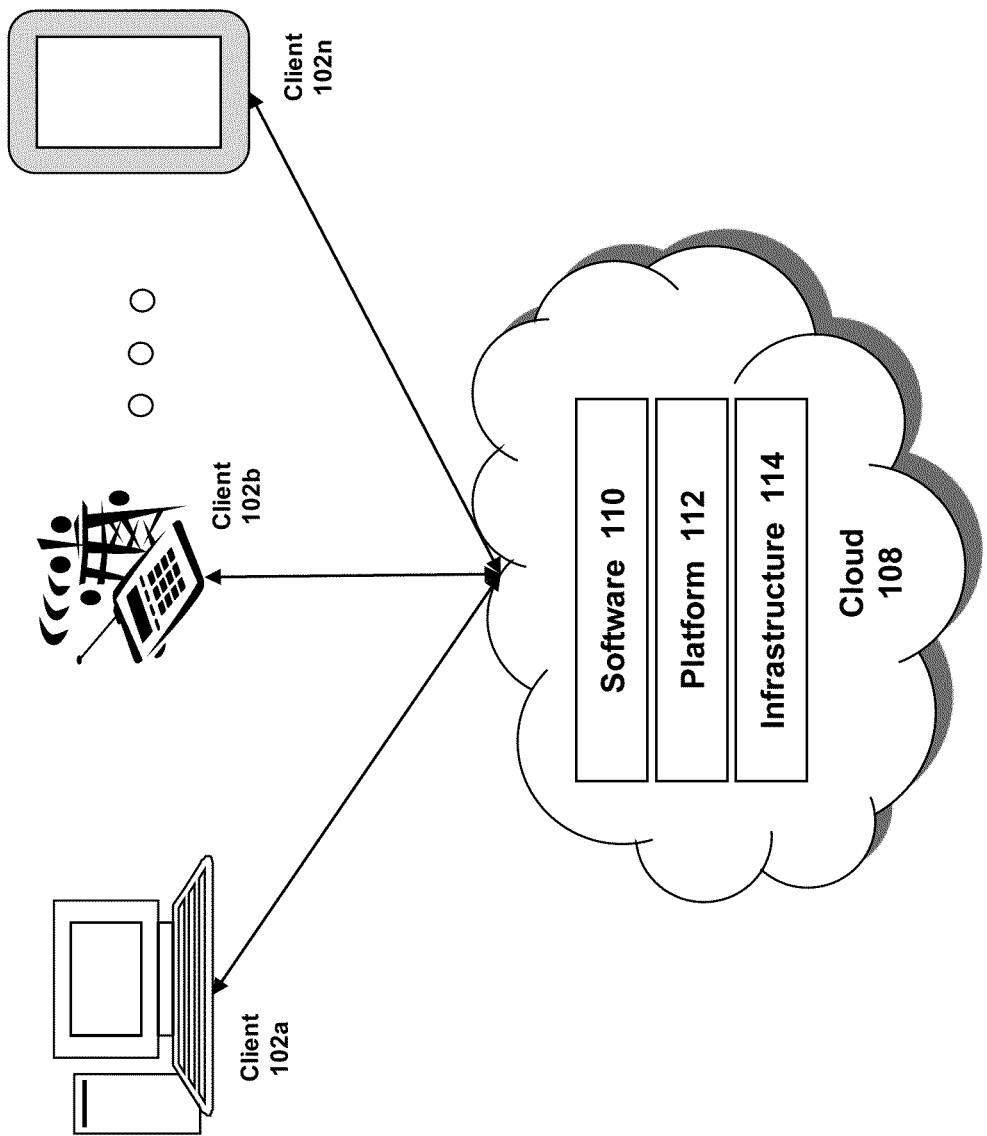
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
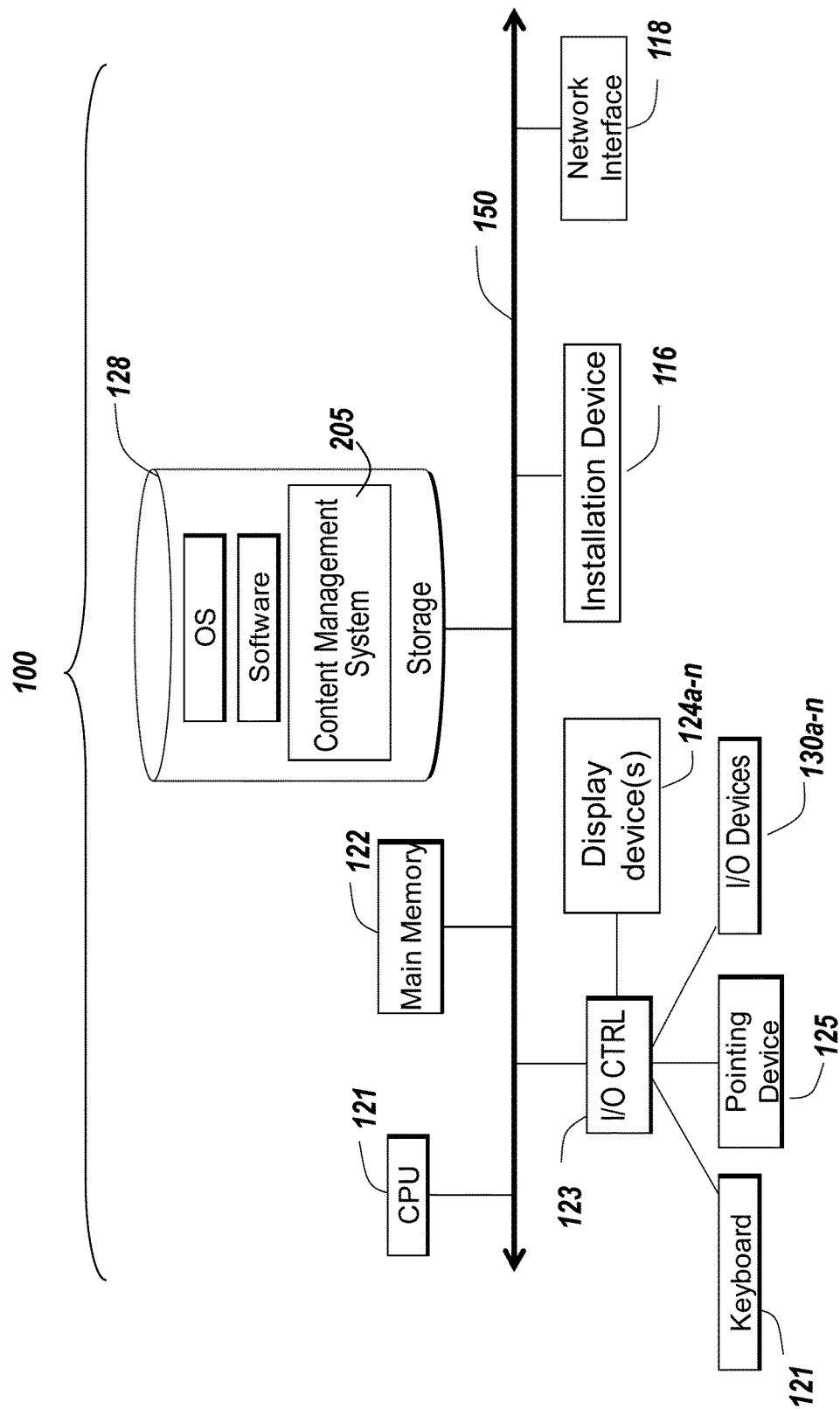
FIGS. 1C and 1D are block diagrams depicting embodiments of computing devices useful in connection with the methods and systems described herein.
Figure 1D:
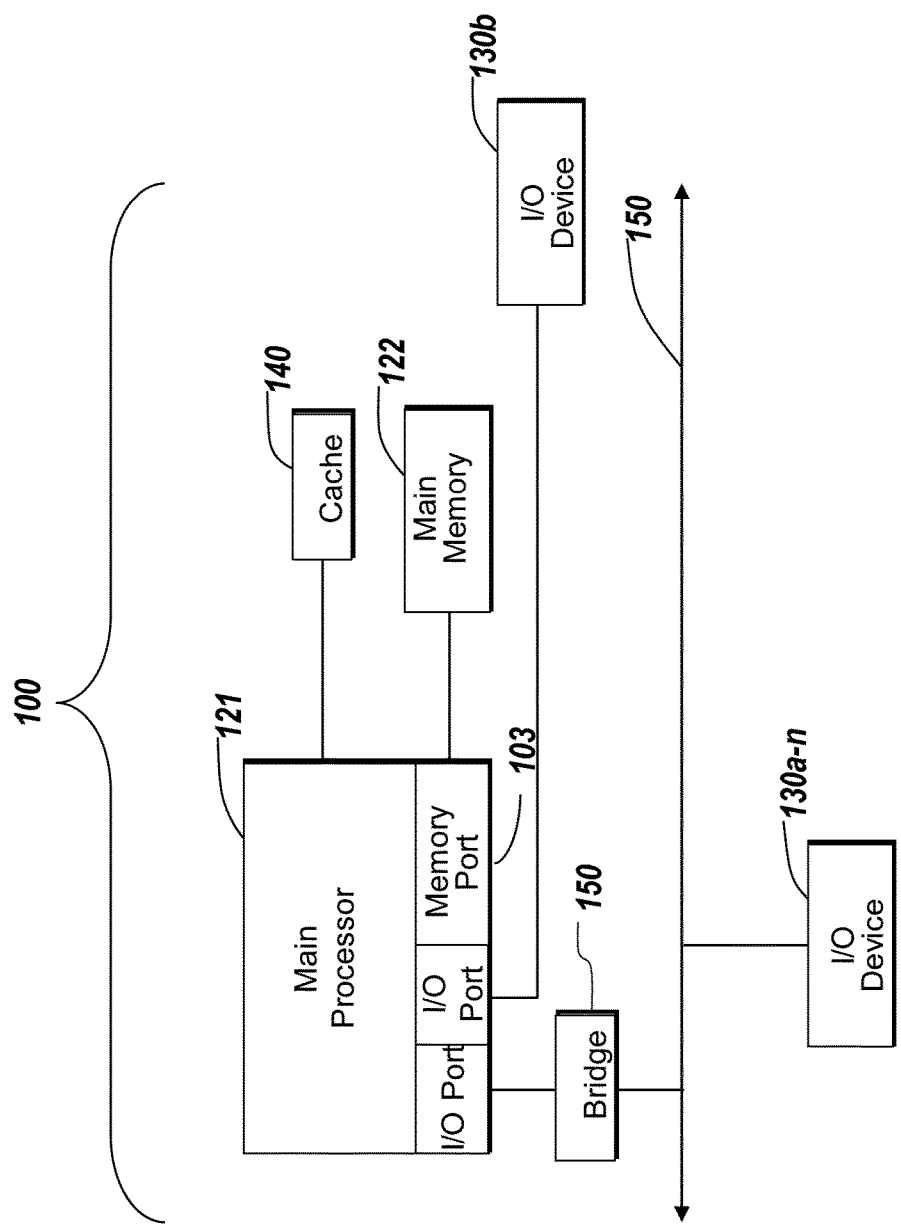

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a content management system 205. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software for the content management system 205. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage devices 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2002, WINDOWS CE, WINDOWS Phone, WINDOWS XP, WINDOWS VISTA, WINDOWS 7, WINDOWS RT, WINDOWS 8, and WINDOWS 10, all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player.

For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Prioritizing Content Packets Based on a Dynamically Updated List of Content Filtering Rules to Reduce Computer Resource Consumption and Extend Battery Life of Remote Devices In various computing environments and applications, servers of a content management system are constantly receiving new content that is then transmitted over one or more networks to remote computing devices. In some such applications, the content management system may filter the content it receives from the servers and selectively sends some of the content to the one or more remote computing devices. Moreover, the content management system may select different content for transmission to respective remote computing devices.

These content management systems, however, are not typically well designed to filter content based on what is contextually relevant to a user. As a result, users of the remote computing devices are bombarded with a large number of content items, many of which are not relevant to the user, which results in the users receiving a large amount of notifications and/or content from the content management server that the users are not interested in.

Receiving and displaying content at the user's computing device utilizes computing resources, such as processing power of the computing device, battery of the computing device as well as occupies real estate on the display screen of the computing device that could otherwise be consumed by content that is more relevant to the user. As such, there is a desire to reduce the amount of content, or at least contextually irrelevant content, that is delivered to the user's computing device. Doing so would reduce the rate at which a user's computing device consumes battery power as each additional content item consumes a certain amount of battery power that is an aggregate of the power consumed to receive the content item, store the content item and render and display the content item. Moreover, it should be appreciated that each contextually irrelevant content item that is transmitted to the user's computing device has an associated computing resource cost, that although individually may seem trivial, in total results in wasting a large amount of computing resources of the user's computing device. In addition, the content management system is also expending computing resources to transmit these contextually irrelevant content items and so, by reducing the number of contextually irrelevant content items that are transmitted to client devices, the content management systems as described herein can reduce the amount of computing resources that are wasted or expended to transmit such content items.

In addition to some of the technical disadvantages described herein with respect to transmitting contextually irrelevant content items, it should be appreciated that transmitting contextually irrelevant content items is a missed opportunity to send a contextually relevant content item. These missed opportunities can result in a user of the computing device resorting to accessing content through channels separate from the content management system. This not only results in the user consuming even more computing resources of the user's device (further draining the battery of the user), but since the user is retrieving content through channels separate from the content management system, the content management system loses visibility on the user's actions and is unable to identify content that the user finds relevant. This reduces the ability of the content management system to identify relevant content for the user (and as a result other users), resulting in a less effective content management system.

Such challenges are pertinent in a variety of contexts, including but not limited to online fantasy sports and the content management systems that deliver fantasy sports related content to users that play online fantasy sports. It should be appreciated that the scope of the present disclosure is not limited to the context of fantasy sports and may be applicable to applications unrelated to online fantasy sports.

Users that play fantasy sports have traditionally accessed content from a plurality of content sources to make decisions about which players to add to their fantasy teams. Often times, news related to particular players can influence a user's decision to add or remove these players from their fantasy team lineups. As such, users desire to receive information about these players as soon as the information is available.

Existing content management systems that provide sports related content to users are not designed for the fantasy user. In particular, the existing content management systems do not have content filtering or selection policies in place that would be useful for fantasy users. Moreover, existing content management systems do not have dynamic content filtering policies to select content that is contextually relevant to a user and that are automatically updated based on actions taken by users on their fantasy lineups. Moreover, users are required to constantly update their content filters to receive contextually relevant information. For example, users typically have to actively update on their own the filters associated with their accounts in order to stay up to date with information concerning one or more players in their respective fantasy lineups. In situations, such as online fantasy sports, where a user may create, update or otherwise modify their fantasy lineups on a very frequent basis, there is a need to provide an improved content management system that is configured to deploy dynamic content filtering policies that are generated responsive to changes in users' fantasy lineups. Thus, the content management system can monitor, update and maintain the content filtering policies associated with one or more users accounts to provide the one or more users with up to date information concerning one or more players in their respective fantasy lineups.

The present disclosure relates, in part, to an improved content management system that is configured to deploy dynamic content filtering policies that are generated responsive to changes in users' fantasy lineups. The improved content management system can maintain a dynamic list of players that are included in currently active fantasy lineups created by the user. The improved content management system can dynamically identify and retrieve one or more content items for the user based in part on fantasy lineup(s) created by the user and/or changes in the user's fantasy lineup(s). The improved content management system can dynamically update a content feed for the user based in part on fantasy lineup(s) created by the user and/or changes in the user's fantasy lineup(s). It should be appreciated that these fantasy lineups may be created in one or more fantasy sports systems that are related or unrelated to the content management system.

Generally, a user of a fantasy sports system may create multiple fantasy lineups for different contests hosted by the fantasy sports system. These multiple fantasy lineups can include multiple players. These multiple fantasy lineups can include different sports or contests. As contests are completed, the fantasy lineups created for those contests may no longer be active. As such, players included in the fantasy lineups corresponding to contests that have been completed may no longer be relevant to a user and as such, content related to such players may not be contextually relevant to the user. Conversely, as the user creates new fantasy lineups or modifies existing lineups to include new players, content related to these new players may be contextually relevant once they are added to a fantasy lineup.

The present disclosure also relates, in part, to generating personalized content filtering policies based on a user's dynamic list of players that is based on a list of players the user has included in his fantasy lineups. The content management system can utilize the personalized content filtering policies that are based on the user's dynamic list of players to identify content related to the players included in the user's dynamic list of players and transmit such content to the user. Moreover, the content management system can utilize the personalized content filtering policies to also prevent the transmission of content related to players not currently included in the user's dynamic list of players. As the dynamic list of players is periodically updated by the content management system, the personalized content filtering policies associated with the user is also automatically dynamically updated without requiring any additional input from the user. This results in increasing the accuracy of transmitting contextually relevant content to the user, thereby reducing computer resources consumed from the transmission, receipt and presentation of contextually irrelevant content. This also results in preserving the computer resources that would have been consumed from the transmission, receipt and presentation of content that is not relevant to the user for content that is contextually relevant to the user.

According to one aspect, systems and methods for prioritizing content packets based on a dynamically updated list of content filtering rules are described. A server including one or more processors is configured to identify an application executing on a client device to which to transmit content. The application is associated with an account and the server can determine that the application is configured with a configuration setting to apply a content filtering policy corresponding to a list of players including one or more players included in one or more lineups associated with the account. The system is further configured to receive a content item from a content source and determine one or more player tags associated with the content item. The player tags identify one or more players with which the content item is associated. The system is further configured to determine that the content item includes a player tag corresponding to a player included in the list of players corresponding to the application. The system is further configured to transmit the content item to the client device for insertion in a content feed provided by the application responsive to determining that the content item includes the player tag corresponding to a player included in the list of players corresponding to the application.

Figure 2:
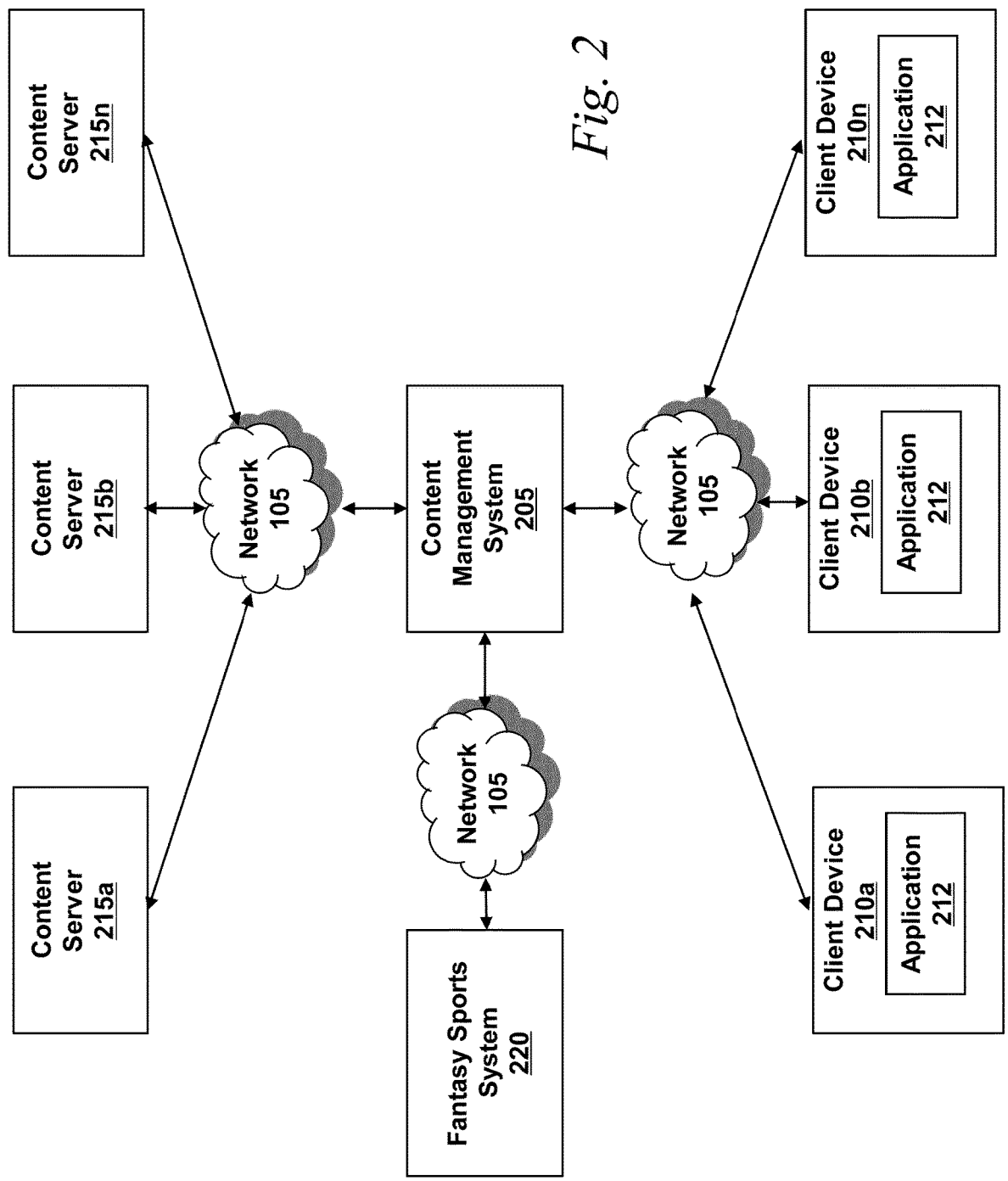
FIG. 2 is a block diagram depicting an embodiment of a content management environment including a content management system in communication with a plurality of content servers and a plurality of client devices executing application instances of the content management system.

Referring now to FIG. 2, a block diagram depicting an embodiment of a content management environment including a content management system in communication with a plurality of content servers and a plurality of client devices executing application instances of the content management system is shown. The content management environment includes a content management system 205, a plurality of client devices 210a-n (generally referred to herein as client device 210) executing application 212, a plurality of content servers 215a-n (generally referred to herein as content server 215) and one or more fantasy sports systems 220. The content management system 205, the plurality of content servers 215 and the fantasy sports system 220 are similar to or can execute on servers similar to the servers 106a-n shown in FIG. 1A, while the client devices 210 are similar to the devices 102a-n shown in FIG. 1A.

The content management system 205 may be communicatively coupled to each of the content servers 215 via a first network, such as the network 105. The content management system 205 may be communicatively coupled to each of the client devices 210 via a second network. The content management system 205 may also be communicatively coupled to the fantasy sports system 220 via a third network, such as the network 105. The first network 105, second network 105 and the third network 105 can be the same network 105 or form part of the same network 105. In some embodiments, the first network 105, second network 105 and the third network 105 can also be different networks 105. In some embodiments, the content management system 205 may communicate with the application 212 executing on each of the client devices 210 via web socket connections established between the content management system 205 and the application 212. The application 212 can be an application configured to communicate with the content management system. In some embodiments, the application 212 can be a web browser executing on the client device. In some embodiments, the application 212 can be a native application executing on the client device 210.

One or more of the content servers 215a-215n can be configured to provide content items to the content management system 205. In some embodiments, the content servers 215 can be web servers or other types of content servers 215 that are configured to provide content items to the content management system 205. The content servers 215 can include social media servers, for instance, TWITTER. In some embodiments, at least one of the content servers 215 provides real-time score updates to sporting events. In some embodiments, at least one of the content servers 215 can be a server hosting or providing news content. In some embodiments, the content server 215 can be a server that an administrator of the content management system 205 has included in a whitelist of content servers 215.

As described above, the content management system 205 can be communicatively coupled to one or more fantasy sports system 220. The fantasy sports system 220 can be configured to host, manage, maintain or provide contests for fantasy sports. The fantasy sports system 220 can be configured to receive fantasy lineups from users of the fantasy sports system 220 as submissions for contests hosted by the fantasy sports system 220. Each fantasy lineup is created for a particular contest and can include a list of players selected by a user, such as by a user of one or more of client devices 210a-210n. In some embodiments, the fantasy lineup becomes active once at least one sporting event for the fantasy sports contest begins and can expire when all of the sporting events for the fantasy sports contest end. Users of the fantasy sports system 220 can submit multiple fantasy lineups for any given contest. Moreover, users of the fantasy sports system 220 can play in multiple contests at a given time.

The content management system 205 can maintain one or more connections with the fantasy sports system 220. In some embodiments, the content management system 205 can establish and maintain persistent connections with the servers of the one or more fantasy sports systems 220 to receive information related to users of the fantasy sports systems. In some embodiments, the connections can be web socket connections.

Figure 3:
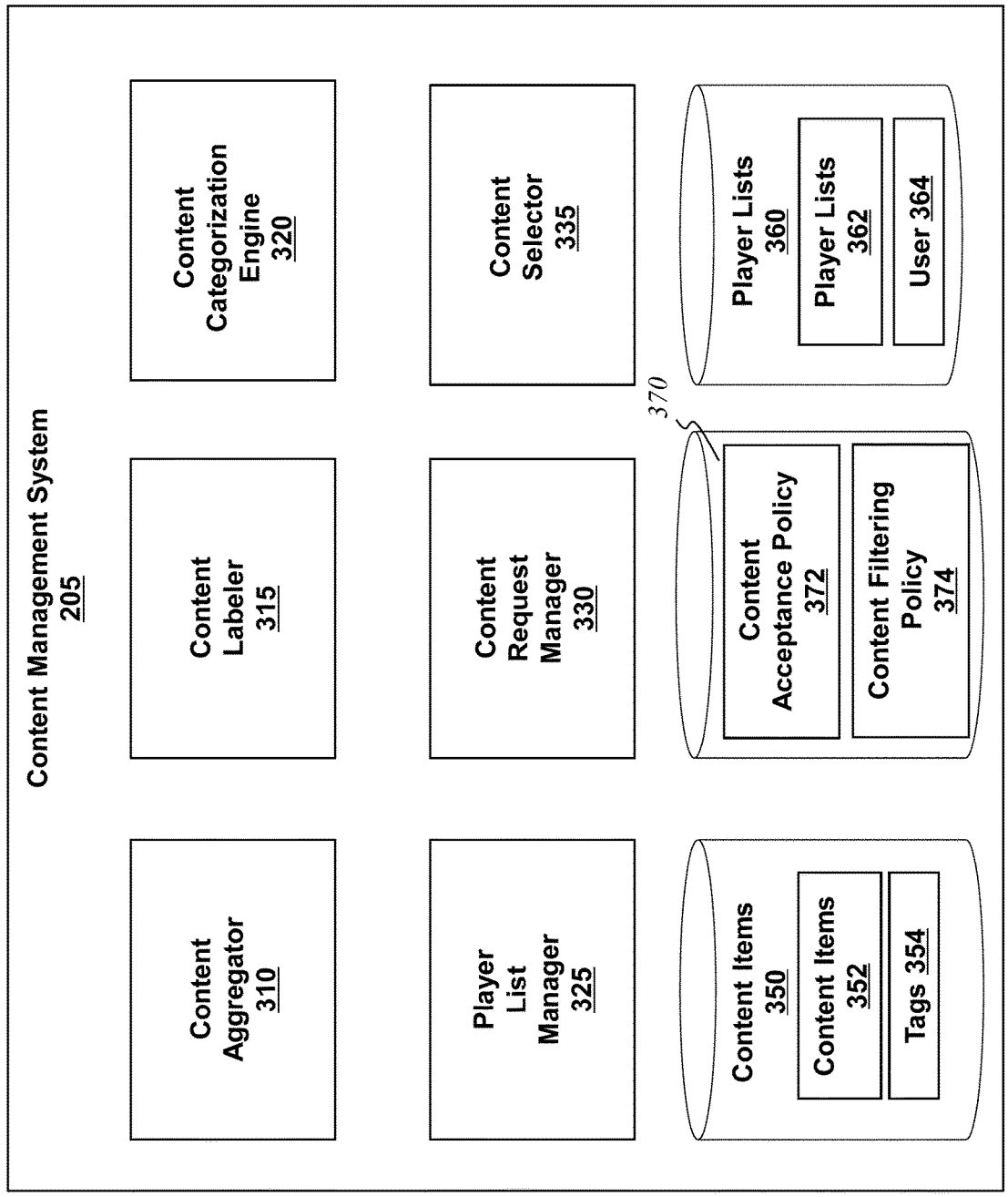
FIG. 3 is a block diagram depicting an embodiment of the content management system shown in FIG. 2.

Referring now to FIG. 3, FIG. 3 is a block diagram depicting an embodiment of the content management system 205 shown in FIG. 2. The content management system 205 can include or be executed on one or more servers, such as the servers 106 shown in FIG. 1A. The content management system 205 can include one or more of a content aggregator 310, a content labeler 315, a content categorization engine 320, a player list manager 325, a content request manager 330, and a content selector 335. The content management system 205 can also include, access, maintain or manage one or more data structures, including but not limited to a content items data structure 350, a player lists data structure 360 and a policies data structure 370. The content items data structure 350 can store one or more content items 352 and one or more tags 354 associated with each of the content items 352. The player lists data structure 360 can store player lists 362 including one or more players included in one or more fantasy lineups. The player lists 362 can be associated with respective users 364 of the content management system 205. The policies data structure 370 can store one or more policies, such as one or more content acceptance policies 372 and one or more content filtering policies 374.

The content aggregator 310 can comprise components, subsystems, modules, scripts or one or more sets of computer-executable instructions and can be configured to aggregate content items 352 from a plurality of content sources. The content aggregator 310, or the content management system 205, can be configured to establish and maintain connections with servers of the plurality of content sources. The content aggregator 310 can be configured to establish listeners to receive content items from the plurality of content sources. The content aggregator 310 can be configured to communicate with each of the plurality of content sources using an Application Programming Interface (API). In some embodiments, the content aggregator 310 can establish communication ports through which the content aggregator 310 can receive content items 352 from the plurality of content sources. In some embodiments, the content aggregator 310 can establish web socket connections through which the content aggregator 310 can receive content items 352 from the plurality of content servers 215. In some embodiments, the content aggregator can establish persistent connections through which the content aggregator can receive content items 352 from the plurality of content servers 215 of content sources.

The content aggregator 310 is configured to receive content items 352 received from the plurality of content sources and accept a subset of the received content items 352 according to the content acceptance policies 372 described herein. Once the content items 352 are accepted, the content items 352 are processed such that they can be delivered to client devices 210 communicatively coupled to the content management system 205.

The content aggregator 310 can be configured to maintain, for each content source from which the content management system 205 is configured to receive content items 352, content acceptance policies 372 identifying one or more rules for accepting content items 352 for distribution to client devices 210 corresponding to users having accounts of the content management system 205. The content acceptance policies 372 can be based on one or more of a subject matter of the content item 352, an author or poster of the content item 352, a publisher of the content item 352, or tags 354 with which the content items 352 are tagged by the content source from which the content items 352 are received. Each tag 354 can include a predetermined sequence of characters or bits that can be used by the content management system 205 for distribution of the content item 352 with which the tag 354 is associated.

In some embodiments, the content acceptance policies 372 can include a list of approved accounts of a social media platform that have been approved by the content management system 205 for accepting content. For instance, an account of an official sports league may be included in the list of approved accounts. Further, accounts belonging to certain sports journalists may also be included in the list of approved accounts. In this way, content that is posted, authored or published by one of the accounts included in the list of approved accounts may be received by the content aggregator and accepted by the content management system 205. Similarly, the content acceptance policies 372 can include a list of approved content publishers such that content posted on or distributed by content publishers included in the list of approved content publishers may be accepted by the content management system 205.

The content acceptance policies 372 can also include a list of content publishers from which to not receive content (e.g., content items 352) or from which to only accept certain types of content. Similarly, the content acceptance policies may identify, for different types of content, a list of content providers or content sources from which to receive that particular type of content.

The content acceptance policies 372 can also include a list of approved tags 354 such that when a content item 352 labeled with a tag 354 included in the list of approved tags 354 is received, the content management system 205 can accept the content item 352. In some embodiments, the tags 354 may be tags provided by the content sources. In some embodiments, the content sources may assign their own tags 354 to content items and as such, the list of approved tags 354 may include tags 354 specific to a particular content source.

The content labeler 315 can comprise components, subsystems, modules, scripts or one or more sets of computer-executable instructions and can be configured to tag the content items 352 accepted by the content aggregator 310 with one or more tags, such as the tags 354. In some embodiments, the tags 354 can be used to classify and sort content items 352 and further use the tags 354 to deliver contextually relevant content items 352 to users of the content management system 205. The content labeler 315 can be configured to add one or more tags 354 to each accepted content item, such as the content items 352 stored in the content items data structure 350.

In some embodiments, the content labeler 315 can associate, with the content item 352, a first tag 354 identifying a content source of the content item 352. In some embodiments, the content labeler 315 can associate, with the content item 352, a second tag 354 identifying a content author (corresponding to an account of the content source) of the content item 352. In some embodiments, the content labeler 315 can associate, with the content item 352, a third tag 354 corresponding to a time stamp at which the content item 352 was first accepted by the content aggregator 310. In some embodiments, the content labeler can associate, with the content item 352, a fourth tag 354 corresponding to a time stamp at which the content item 352 was first published by the content source. In some embodiments, the content labeler 315 can associate, with the content item 352, a fifth tag 354 (see tags 354a-n in FIG. 4) corresponding to a player mentioned in the content item or a player to which the content item 352 may be related. In some embodiments, the content labeler 315 can associate, with the content item 352, a sixth tag 354 corresponding to a sport or league mentioned in the content item 352 or a sport or league to which the content item 352 may be related. In some embodiments, the content labeler 315 can associate, with the content item 352, a seventh tag 354 corresponding to a team mentioned in the content item 352 or a team to which the content item 352 may be related. In some embodiments, the content labeler 315 can associate, with the content item 352, an eighth tag 354 corresponding to a type of content item 352, for instance, a news content item 352, an editorial content item 352, an opinion content item 352, a score update content item 352, an injury content item 352, a weather related content item 352, among others. In some embodiments, the eighth tag 354 can be a tag that is used to classify the content item 352 as one of "breaking news," "injuries," "lineups," or "analysis," similar to the selectable options shown in FIG. 7C. In some embodiments, the content labeler 315 can associate, with the content item 352, a ninth tag 354 corresponding to a media type of content item, for instance, a text article, a video content item, an audio content item, among others. It should be appreciated that the content labeler 315 can associate multiple tags 354 with the same content item 352 and each content item 352 can be associated with multiple tags 354 belonging to the same type of tag 354.

In some embodiments, the content tags corresponding to content items 352 may be provided by the content source of the content item 352. In some embodiments, the content labeler 315 may be configured to use the same content tag or may be configured to match the content tag to a content tag that can be used by the content management system 205 for filtering and delivering the content item 352.

The content categorization engine 320 can comprise components, subsystems, modules, scripts or one or more sets of computer-executable instructions and can be configured to categorize each of the content items 352 accepted by the content management system 205. The content categorization engine 320 can be configured to categorize each of the content items 352 based on the one or more tags 354 provided by or assigned by the content labeler. The content can be categorized according to one or more predetermined categories. In some embodiments, the content can be categorized in accordance with a hierarchical structure. For instance, a content item 352 can first be categorized as a score related content item 352 or a news related content item 352. This categorization is to determine whether to display the content item 352 on a news page of the application or a scores page of the application. In some embodiments, the content categorization engine 320 may determine to categorize the content item 352 as a news content or a scores content based on one or more tags 354 associated with the content item 352. In some embodiments, the content categorization engine 320 can categorize a news content item 352 into one of a plurality of predefined categories, including but not limited to "breaking news," "injuries," "lineups," or "analysis," as shown in FIG. 7C.

The player list manager 325 can comprise components, subsystems, modules, scripts or one or more sets of computer-executable instructions and can be configured to manage player lists for users of the content management system 205. The player list manager 325 can be configured to communicate with one or more fantasy sports systems 220 or their servers thereof. The player list manager 325 can be configured to access a list of accounts of users of the content management system 205. In some embodiments, the accounts of users 364 can be linked to accounts of the users at the one or more fantasy sports systems 220.

The player list manager 325 is configured to maintain, for each user, a player list 362 and a list of users 364 of the content management system 205. The player list 362 can include a list of all of the players that the user has selected in one or more lineups at one or more fantasy sports systems 220. The player list manager 325 can be configured to receive updates from the one or more fantasy sports systems 220 with which the accounts of the content management system 205 and the fantasy sports systems 220 are linked. The updates can include updates to a user's fantasy lineups submitted at the fantasy sports systems 220. In some embodiments, the player list manager 325 can be configured to establish a web socket connection with one or more servers of fantasy sports systems and be configured to receive activity updates of the users. In some embodiments, the content management system 205 may identify a user's account at the fantasy sports system 220 and link the two accounts (the content management system 205 and the fantasy sports system 220) of the user. In this way, lineup changes, additions, or deletions made in an account of the fantasy sports system 220 can be provided to the content management system 205, thereby allowing the content management system 205, or the player list manager 325, to update the player lists 362 of users 364 of the content management system 205.

The player list manager 325 can be configured to receive, for a user of the content management system 205, from a fantasy sports system 220, a communication identifying a fantasy lineup and an account of the user maintained by the fantasy sports system 220. The player list manager 325 can use the account of the user maintained by the fantasy sports system 220 to identify the corresponding account of the user maintained by the content management system 205 to which the account of the user of the fantasy sports system is linked. The player list manager 325 can then retrieve an existing player list 362 associated with the account of the user maintained by the content management system 205 and merge the fantasy lineup with the existing player list 362. In some embodiments, merging the fantasy lineup with the existing player list 362 can include adding the players from the fantasy lineup that are not currently in the existing player list to the existing player list.

In some embodiments, the player list manager 325 can maintain, for each player in the player list 362, a number of lineups of the user in which the player is included. The player list manager 325 can also maintain, for each player in the player list 362, an expiration condition according to which the player will be removed from the player list 362. For instance, the player is removed from the player list when the player is no longer included in any fantasy lineup of the user for contests that are ongoing or are scheduled for the future. As such, the player list manager 325 can remove the player from the player list 362 once the expiration condition is satisfied. In some embodiments, the expiration condition is satisfied when all of the sporting events of a particular fantasy contest have ended. In some embodiments, the expiration condition is satisfied when all of the sporting events of a particular fantasy contest have begun. In some embodiments, the player list manager 325 can receive score updates from one or more content servers and use the score updates to determine when sporting events end. In this way, the player list manager 325 maintains a list of players that are relevant to a user in that the players are part of lineups submitted for contests having one or more sporting events that have yet to be completed.

Although the player list manager 325 as described herein may receive a list of players associated with a user from one or more fantasy sports systems 220, the player list manager 325 can be configured to receive the list of players from the client device of the user. In some embodiments the player list manager 325 can be configured to determine the list of players from the request for content received from the user. In some embodiments, the request for content can include the list of players that the user is interested in, which can be based on players that are included in one or more fantasy lineups. In some embodiments, the request for content generated by the client device or the application executing on the client device can include the list of players responsive to determining that a configuration setting for filtering content based on the players included in one or more fantasy lineups of the user. In some embodiments, the request for content can include a flag or other indicator indicating that the status of the configuration setting for filtering the content. For instance, the flag can be set to a first value if the configuration setting is enabled and the flag can be set to a second value if the configuration setting is disabled.

The content request manager 330 can comprise components, subsystems, modules, scripts or one or more sets of computer-executable instructions and can be configured to manage content requests. In some embodiments, the content request manager 330 can be configured to receive requests for content. The requests for content may be requests generated at a website of the content management system, at one or more native applications executing on remote devices, among others. In some embodiments, the requests for content can be a request for a specific content type. In some embodiments, the requests for content can be generated responsive to a user taking an action at the website or on an application executing on a remote device.

The content request manager 330 can receive a request for content from a client device. The request for content can include an identifier that the content management system can use to identify a user of the content management system 205 to which the request for content corresponds. In some embodiments, the request can come from a native application, browser or other application executing on a remote computing device. In such embodiments, the request can include an application identifier or an account identifier identifying the user of the content management system 205. The request can further include a type of content being requested. Examples of a type of content can include news, scores, among others.

Figure 7D:
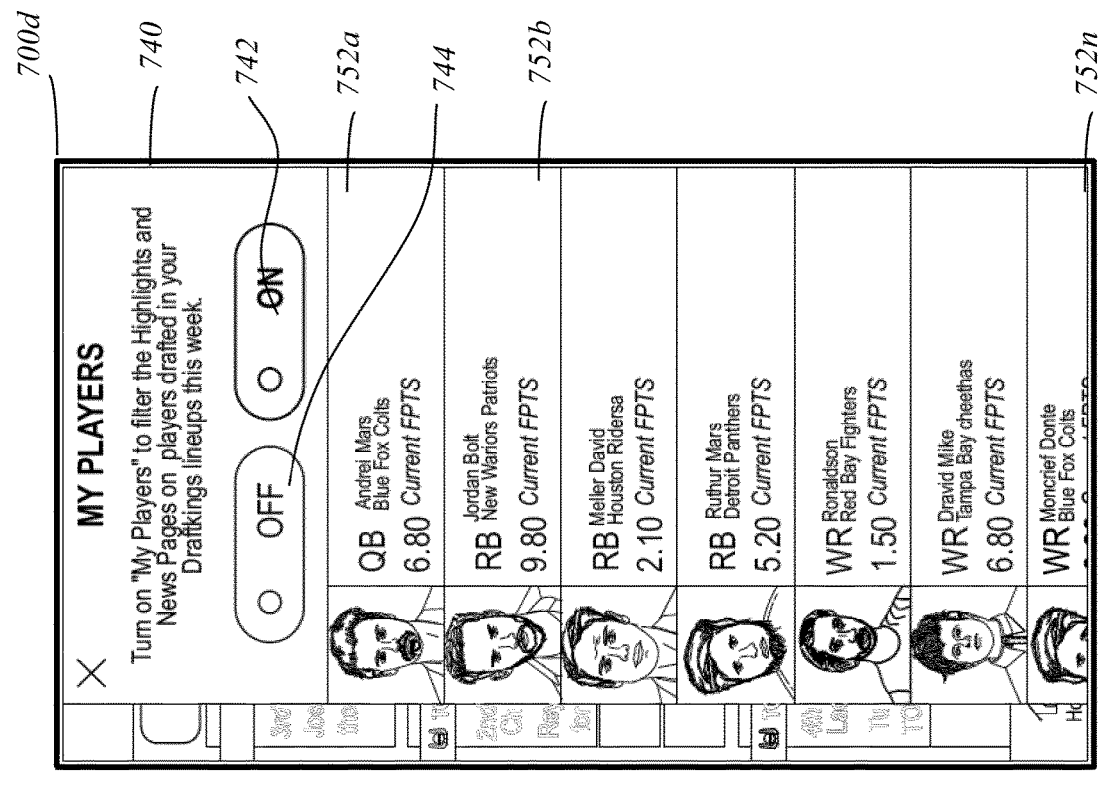
Figure 7C:
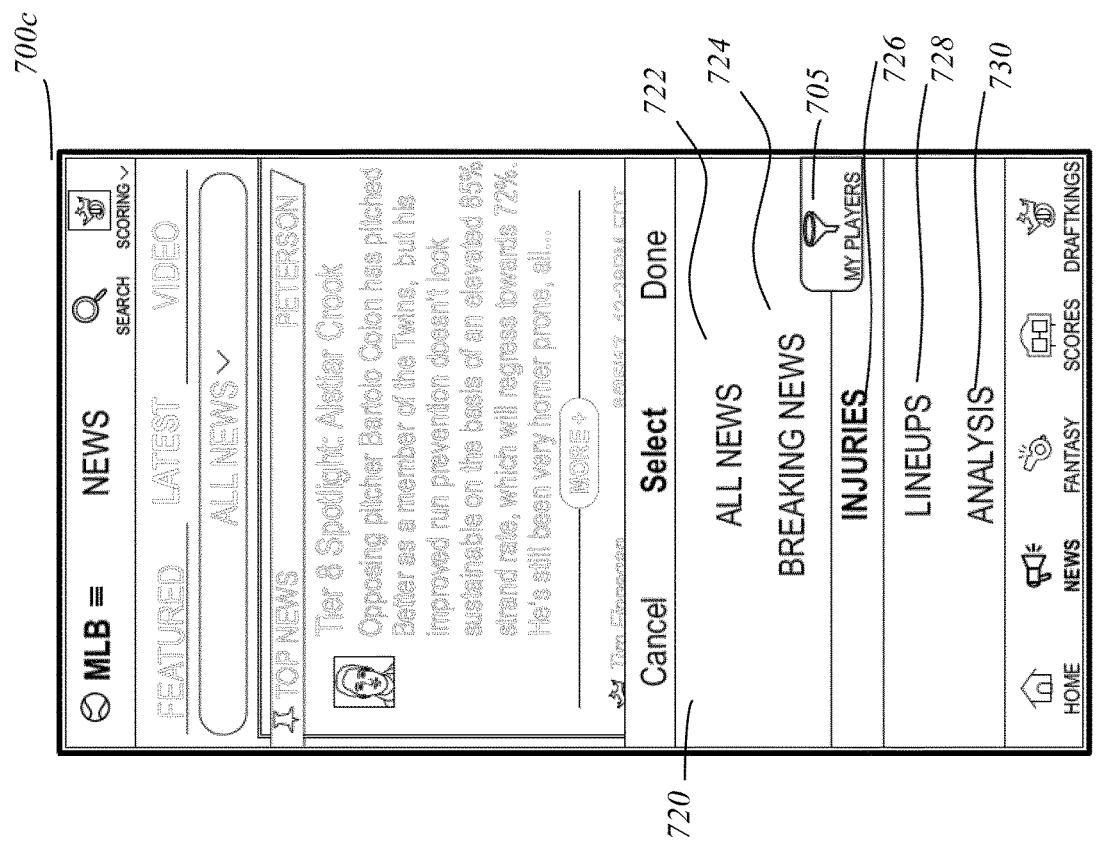

Referring briefly to FIGS. 7A-7D, FIGS. 7A-7D are screenshots of user interfaces of the application shown in FIG. 2. As shown in FIG. 7A, a screenshot 700a shows an interface including a first content feed including a plurality of content items 710a and 710b. The interface also shows a navigation bar 720 at the bottom of the interface including a plurality of selectable objects for navigating the application. The interface includes a "my players" icon, which is a selectable object, which when interacted with, causes the application to modify the interface to display a "my players" window 740 in the interface as shown in the screenshot 700d in FIG. 7D. The window 740 includes a first selectable object 742 for selecting a first configuration setting in which the content displayed in the content feed is limited to content tagged with player tags corresponding to players 752a-752n included in the player list of the user of the application. The window 740 also includes a second selectable object 744 for selecting a second configuration setting in which the content displayed in the content feed is not limited to content tagged with player tags corresponding to players 752a-752n included in the player list of the user of the application, but rather, allows the content feed to display content items related to all of the players that are both included in the player list and not included in the player list. It should be appreciated that a single selectable object may be toggled between two states to toggle the configuration setting between the first configuration setting and the second configuration setting.

Still referring to FIGS. 7A-7D, when a user of the application accesses the application, the application may display a home page, which may be accessed by the icon 762. The user can access a news page of the application via the icon 764. The user can access a fantasy page of the application via the icon 766. The user can access a scores page of the application via the icon 768. The user can cause the client device on which the application is executing to launch a second application of the fantasy sports system via the icon 770. As shown in FIGS. 7A-7C, the news page is displayed as indicated by the indicator 704. Within the news page, a user can select between a "featured" page, a "latest" page and a "video" page. The featured page is configured to display featured content items, the latest page is configured to show the most recently received content items, and the video page is configured to only display content items including video. Moreover, when a user selects on the object 708 shown in FIG. 7A, the application is caused to display a menu including a plurality of selectable objects 722-730. By selecting one of the selectable objects 722-730, the user can control the type of content items that the content management system will transmit and/or display on the application.

As described with respect to FIGS. 7A-7D, the content request manager 730 can be configured to receive a request for content via interactions by a user with an application executing on a client device. The user may request a particular type of content via the interface. The application can be configured to transmit requests to the content management system 205 based on the interactions. In some embodiments, the content request manager 730 can be configured to receive a request and parse the request to determine whether a first configuration setting is set or established on the application executing on the client device.

The request or the connection can allow the content request manager 730 to monitor the state of the application, including but not limited to, whether the first configuration setting is established. Responsive to determining that the first configuration setting is established (which corresponds to filtering content based on players included in the user's player list), the content request manager can configure the content management system to send content that includes tags associated with the players included in the user's player list.

Referring again to FIG. 3, the content selector 335 can comprise components, subsystems, modules, scripts or one or more sets of computer-executable instructions and can be configured to select content to transmit to applications of the content management system 205 that are executing on remote computing devices. The content selector 335 can be configured to transmit content items responsive to the content management system receiving requests from the applications.

The content selector 335 can be configured to determine the type of content items to transmit to the application responsive to the request received from the application as well as based on state information associated with the application at the time the request was transmitted. The state information associated with the application at the time the request was transmitted can be determined by establishing a persistent connection, such as a web socket connection with the application to determine which page of the application the user is on, one or more configuration settings set on the application, among others. The content selector 335 can determine, from the request or the state information, the type of content to transmit to the client device on which the application is executing.

For instance, referring now also to FIG. 7C, a user can select to receive one or more content items related to injuries by selecting the object 726. Moreover, as shown in FIG. 7D, the user can also select the object 742 to apply the first configuration setting to the application (to only receive or display content items tagged with tags associated with players included in the player list of the user). The content selector 335 can, based on these selections, identify content items that are received by the content aggregator 310 and tagged by the content labelers 315 as content items that include a first tag corresponding to a content type (news instead of scores), a second tag corresponding to content filtering parameters (injuries instead of breaking news, lineups, or analysis) and a third tag corresponding to one of a player (such as any of the players included in the player list of the user). In some embodiments, a single tag can include the same information conveyed by the first tag, second tag, and third tag, or any combination thereof.

The content selector 335 can identify, from the plurality of content items stored in the content items data structure 350, a subset of content items to transmit to the application. In some embodiments, the content selector 335 can maintain a queue of content items to transmit to the application. In some embodiments, the queue of content items can be ordered in accordance to chronological order or reverse chronological order. For instance, the content items can be ordered based on a timestamp of the content item such that the content item that the content management system most recently received is placed at the top of the queue of content items.

The content selector 335 can be configured to rearrange the content items included in the queue of content items as the user adjusts one or more content filtering parameters on the application. The content selector 335 can prioritize one or more content items over other content items included in the queue of content items. The content filtering parameters can include parameters that affect which content is selected by the content selector 335 for transmission and/or display to the client device. The content filtering parameters may change as the user navigates to different pages on the application or as the user changes the type of content items the user would like to view in the content feed.

The content selector 335 can be configured to assign each content item included in the queue a priority score. The priority score can be determined based on the tags associated with the content item. The priority score can be determined based on the tags associated with the content item and based on the players included in the player list of the user maintained by the player list manager 325. As players are removed from the player list manager, the priority score of content items having player tags associated with such players can be decreased. Conversely, as players are added to the player list manager, the priority score of content items having player tags associated with players that have been added can be increased. In some embodiments, the content selector 335, or the content management system 205, may transmit content items based on the priority scores of the content items. Stated in another way, the content selector 335, or the content management system 205, may transmit content items that relate to players included in the player list before transmitting content items that relate to players not included in the list.

In some embodiments, the content selector 335 can be configured to send all of the content accepted by the content management system 205. The content selector 335 may send the content with one or more tags assigned by the content labeler. The content selector 335 can be configured to communicate with the application executing on the client device to transmit all of the content items to the client device.

The application executing on the client device may be configured to filter the content that is displayed within a content feed of the application using the tags assigned to the content items. The application executing on the client device may maintain one or more queues of content items for display within the content feed. In some embodiments, the content items can be assigned to different queues or can be tagged with tags that can be used to determine which page of the application the content items are to be displayed on. Furthermore, in some embodiments, the application can be configured to determine if the configuration setting for filtering content based on players included in the player list is enabled. The application can then select content items that are tagged with player tags corresponding to the players included in the player list for display in the content feed of the application. In some embodiments, the application can select a content item for display in the content feeds based on determining that the content item includes a player tag that corresponds to a player that the user is interested in (for example, by determining that the player is included in an active fantasy lineup) and determining that the content item falls within the content type that the user has requested to display via the application (content type can be news, scores, fantasy, breaking news, lineups, injuries among others).

The content items data structure 350 is a data structure that can store one or more content items that are received from any of the plurality of content sources and have been accepted by the content aggregator 310 in accordance with the content acceptance policies 372. The content items 352 stored in the data structure can be associated with one or more tags 354, such as the tags described herein. The content items data structure 350 can be stored on a server of the content management system 205 or can be accessed by the content management system.

In some embodiments, the content management system 205 can be configured to modify the format of content items received from multiple content sources using one or more content modification policies stored in the policies data structure 370. In some embodiments, the content management system 205 can receive a first content item from a first content source in a first content format. The content management system 205 can then select, from a plurality of content modification policies, a first content modification policy to modify the format of the first content item from the first content format to a second content format that the application executing on the client device is configured to present in the content feed. The content management system can then format the first content item from the first content format to the second content format and store the first content item in the second content format. The content management system can then store the content item in the content items data structure 350. The content selector 335 can then retrieve the content item from the content items data structure 350 and transmit the first content item in the second content format to one or more applications executing on client devices.

As shown in FIG. 7B, the screenshot 700b shows a content item 710c. The content item 710c is formatted to show the type of content (e.g. Analysis) of the content item (box 712), an author (e.g. David Hussy) of the content item (box 714), the timestamp corresponding to the content item (box 716) and the content publisher (DKTV) of the content item (box 718).

Similarly, the content management system 205 can be configured to receive a second content item from a second content source in a third content format. The content management system 205 can then select, from the plurality of content modification policies, a second content modification policy to modify the format of the first content item from the third content format to a fourth content format that the application executing on the client device is configured to present in the content feed. The content management system can then format the second content item from the third content format to the fourth content format and store the second content item in the fourth content format at the content items data store 350. The content management system can then transmit the second content item to one or more client devices in the fourth content format for display in the content feed provided by respective applications executing on the client devices. For instance, as show in FIG. 7A, the content item 710b is a content item corresponding to a TWITTER post that has been modified into another format for display on the user device. The content item 710b identifies the content source, the time stamp, and the type of content (e.g. Analysis).

The player lists data structure 360 can store one or more player lists 362 maintained by the content management system 205. Each player list can be associated with a user 364 that has an account with the content management system 205 and at least one fantasy sports system 220. The player lists data structure 360 can be stored on a server of the content management system 205 or can be accessed by the content management system 205.

Figure 4:
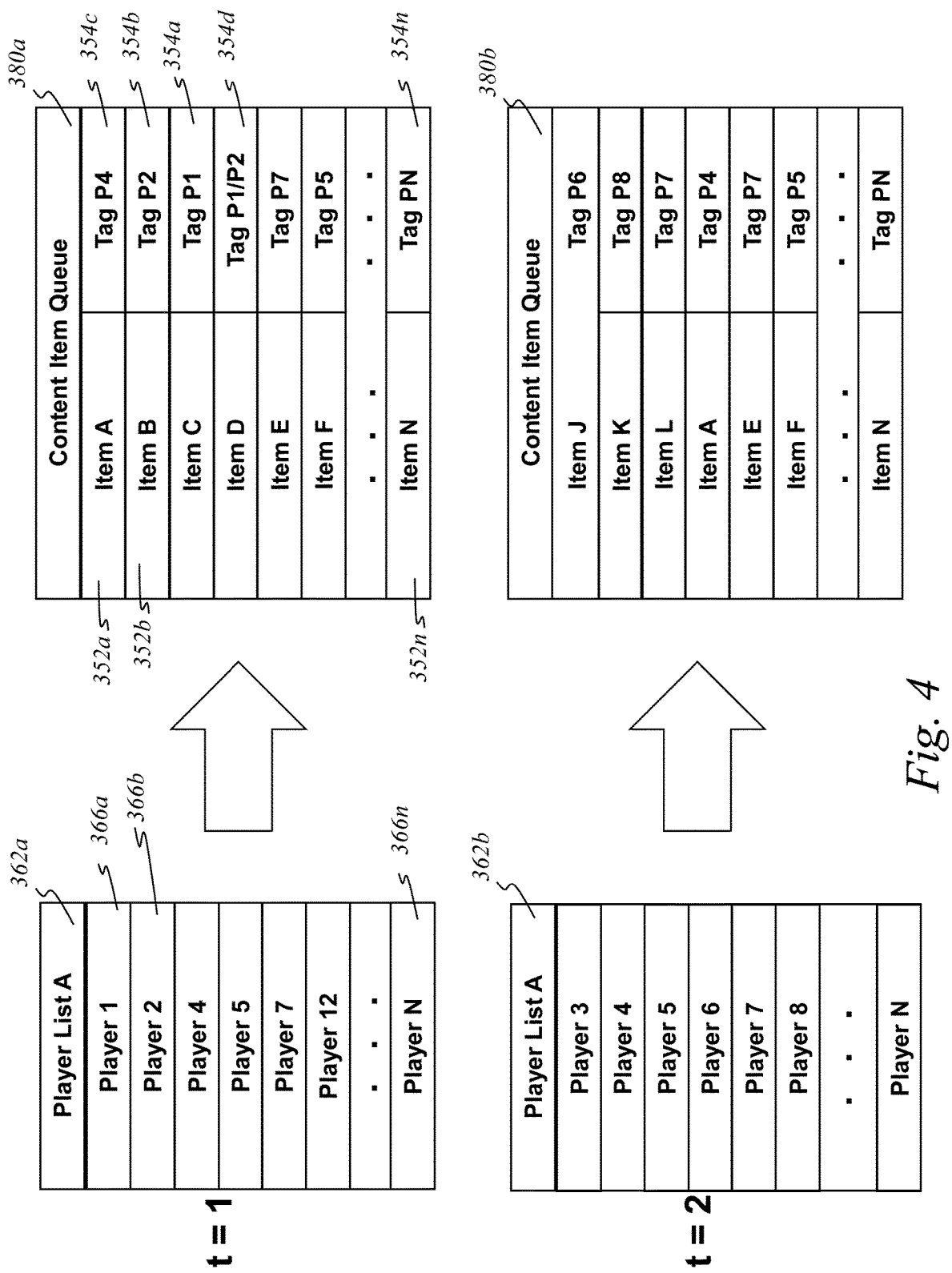
FIG. 4 illustrates a list of players and corresponding queue of content items maintained by the content management system shown in FIGS. 2 and 3 at a first time and a second time.

Referring now to FIG. 4, FIG. 4 illustrates a list of players and corresponding queue of content items maintained by the content management system shown in FIGS. 2 and 3 at a first time and a second time. At a first time (t=1), a first player list A 362a of a particular user is shown and it includes a first set of players 366a-n. These players are players the user has selected in one or more fantasy lineups that the player has submitted for a contest provided by one or more fantasy sports systems 220 in communication with the content management system 205. At a second time (t=2) that occurs after the first time, the first player list A has been updated by the player list manager 325 to remove certain players from the list as those players are no longer in any active fantasy lineups of the user. As shown in FIG. 4, at t=2, Player 1 and Player 2 are no longer in the updated first player list A 362b, while Player 3, Player 6 and Player 8 have been added to the updated first player list A 362b.

FIG. 4 also shows a queue 380a of content items 352 at the first time and an updated queue 380b of content items 352 shown at the second time. The queue 380a includes content items that are based on the players included in the first player list A 362a. The queue includes content items that are associated with respective player tags. Each of the player tags is specific to one or more players. For instance, player tag P4 corresponds to Player 4 and is associated with content item A 352a. Content item A is included in the queue 380a because the content item A is tagged with a player tag that corresponds to a player in Player List A 362a. TagP1/P2 354d is associated with content item D and was selected because either Player 1 or Player 2 is included in the Player List A 362a. As shown in the queue 380a, the content items may be arranged in accordance to a content prioritization policy, which in some embodiments, may be based on the freshness of the content item.

The queue 380b corresponds to the second time (t=2) and includes content items that have been added to the queue since the first time. In particular, as the player list A was updated from the first time to the second time, content items associated with player tags identifying players included in the updated player list 362b are included in the queue 380b, while content items associated with player tags identifying players not included in the updated player list 362b are removed from the queue. As shown in queue 380b, the content items J and K were added as Players 6 and 8 were added to the updated player list 362b. Content items corresponding to Players 1 and 2, such as content items C and D shown in the queue 380a are removed from the updated queue 380b. Additional details regarding the ranking of content items in the queue are described below with respect to FIG. 6.

In this way, the content management system 205 is configured to maintain a queue of content items for a given user that is dynamically and automatically updated based on updates to a player list of the user maintained by the content management system 205 but updated based on updates received from at least one fantasy sports system 220. Moreover, the queue is also based on configuration settings of the application and although not shown, can be modified to add or remove content items from the queue based on the type of content the application has requested. As the user navigates between different pages of the application, the content item queue can be updated to include content items that correspond to the particular page of the application identified in the request. In some embodiments, all content items may be included in the queue and be assigned a priority score, which may be dynamically adjusted based on the status of the player list. As such, instead of adding content items to or removing content items from the queue, the position of the content items may be rearranged as the player list is updated by adding new players or removing existing players.

As described herein, the queue of content items is maintained by the content management system 205. In some embodiments, the queue can be maintained on the client device associated with the user. In some embodiments, the queue can be rearranged via instructions from the content management system 205 or can be rearranged by the application executing on the client device. In some embodiments, the content management system 205 may offload some of the content filtering functionality to the client devices. In this way, the content management system can transmit all content items that are accepted for delivery to the client device and the client device can maintain the content items in a queue. The client device can then rank each of the content items it receives based on a prioritization score. The prioritization score can be assigned by the application executing on the client device. In some embodiments, the prioritization score can be computed by the content management system and provided to the client device. The client device can rank the content items using the content filtering policies described herein. In some embodiments, the client device can prioritize content items that are tagged with certain player tags that correspond to the list of players that the user is interested in over content items that are either not tagged or tagged with players that correspond to players the user is not interested in. In this way, all of the content items may be transmitted to the client device but may be displayed at the client device based on the prioritization score assigned to the content items by the application or client device. In some embodiments where the client device and the content management system are communicating via a web socket, all the content items can be transmitted to the client device but displayed at the client device according to the prioritization score assigned to the content items by one of the content management system or the application executing on the client device. It should be appreciated that some of the functionality of the content management system can be offloaded to the applications executing on client devices.

Figure 5:
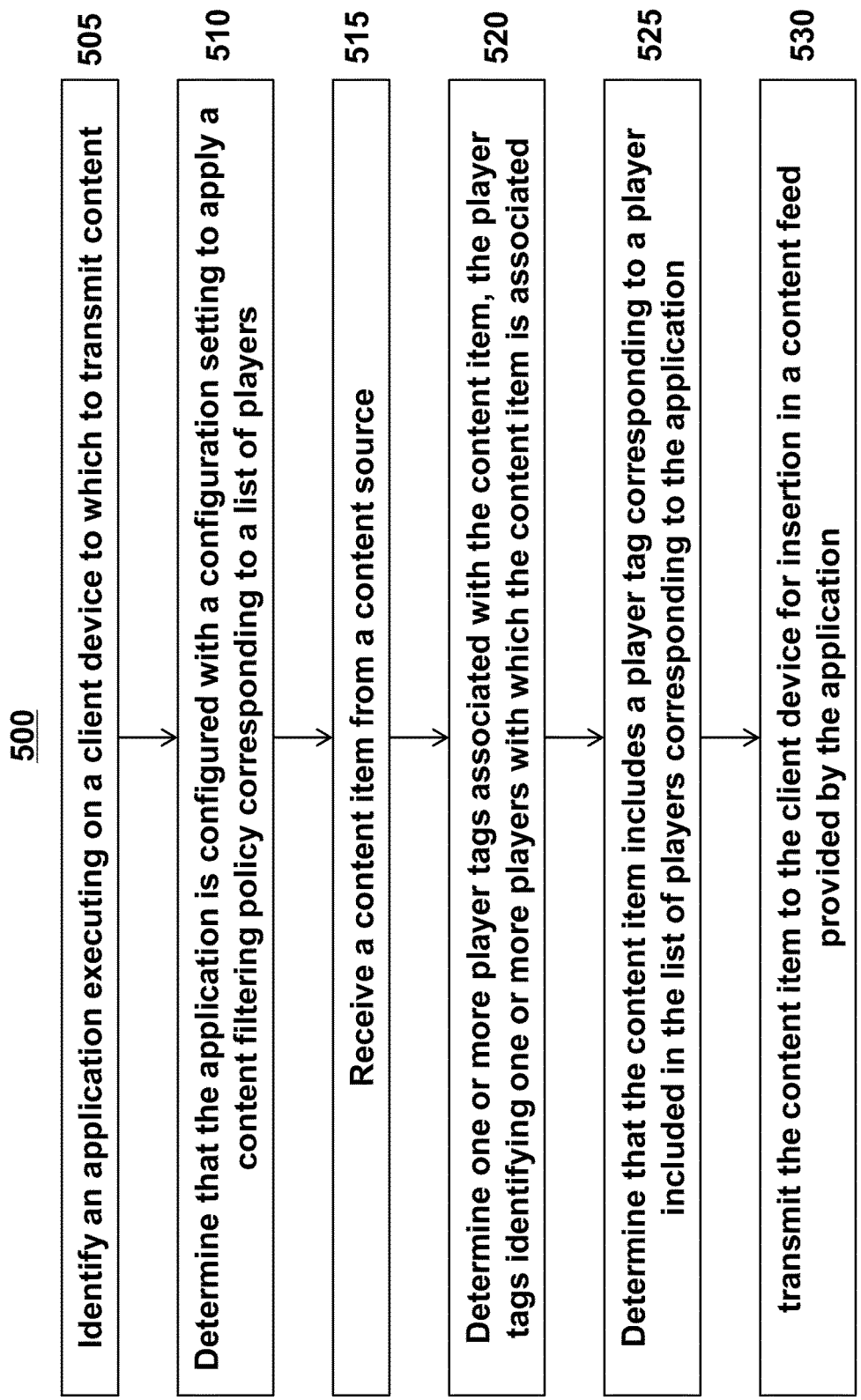
FIG. 5 illustrates a flow diagram of a method of transmitting content to a remote device responsive to determining that the content item is tagged with a player tag corresponding to a player included in the list of players shown in FIG. 4.

Referring now to FIG. 5, FIG. 5 illustrates a flow diagram of a method of transmitting content to a remote device responsive to determining that the content item is tagged with a player tag corresponding to a player included in the list of players shown in FIG. 4. In brief overview, a server of a content management system can identify an application executing on a client device to which to transmit content (BLOCK 505). The server can determine that the application is configured with a configuration setting to apply a content filtering policy corresponding to a list of players including one or more players included in one or more lineups associated with the account (BLOCK 510). The server can receive a content item from a content source (BLOCK 515). The server can determine one or more player tags associated with the content item (BLOCK 520). The server can determine that the content item includes a player tag corresponding to a player included in the list of players corresponding to the application (BLOCK 525). The server can transmit the content item to the client device for insertion in a content feed provided by the application responsive to determining that content item includes the player tag corresponding to a player included in the list of players corresponding to the application (BLOCK 530).

In further detail, at BLOCK 505, a server of a content management system, such as the content management system 205 can identify an application executing on a client device to which to transmit content. The content management system can receive a request for content from the client device. In some embodiments, the content management system can receive a request for content from the client device responsive to an application configured to communicate with the content management system being launched on the client device. In some embodiments, the content management system can receive a request for content from the client device responsive to a user navigating through different pages of the application executing on the client device. The request for content can identify the page of the application for which the content is requested.

The request for content can include an indication corresponding to a content filtering policy. The application from which the request for content was transmitted can be configured to include a flag in the request for content. The flag can be used by the content management system to apply a content filtering policy. In some embodiments, the application can be configured to include the flag in the request for content responsive to determining that a particular configuration setting has been selected on the application. The configuration setting can be a selectable object, which when selected, can indicate to apply the content filtering policy.

In a fantasy sports application, the configuration setting can be implemented via an actionable object that enables content to be filtered according to players that the user has included in one or more active lineups. In some embodiments, the actionable object can appear on one or more pages of the application. Upon selection of the actionable object (see 705 in FIG. 7A), a second page or window can be displayed via the application. The second page or window (see FIG. 7D) can include a list of players included in one or more active lineups of the user and an actionable object (742 in FIG. 7D) to select whether to apply the content filtering policy.

At BLOCK 510, the server of the content management system can determine that the application is configured with a configuration setting to apply a content filtering policy. In some embodiments, the server of the content management system can determine that the application is configured with a configuration setting to apply a content filtering policy responsive to receiving the request including the flag or other indicator to apply the content filtering policy (e.g., content filtering policy 374). The content filtering policy can correspond to a list of players including one or more players included in one or more lineups associated with the account of the user. The content filtering policy can correspond to one or more contents or one or more sports associated with the account of the user (e.g., contests the user has participated in). The content filtering policy can correspond to a user profile associated with the account of the user. The user profile can include characteristics of the user, such as but not limited to, home location, favorite teams, and/or favorite sports. The content management system can maintain a player list for each user account. In some embodiments, the player list can be generated by the content management system by linking the content management system to one or more fantasy sports systems where the user of the content management system is registered to compete.

The player list can be periodically and automatically updated to reflect a current list of players included in lineups that are active at a given time. By configuring the content management system to automatically update the player list, the system has a current player lineup based on multiple fantasy sports systems. In contrast, if the client device or the application executing on the client device were to maintain the player list, the client device would have to maintain a connection with each of the fantasy sports systems to receive lineup updates. In some embodiments, the content management system can update the list of players responsive to a user of the fantasy sports system modifying an existing lineup or adding a new lineup.

Given that client devices have reduced processing capabilities and can oftentimes have finite energy (for instance, cell phones), requiring client devices to maintain the player list would consume unnecessary power and drain the battery of the client device. Moreover, it would require the client device to consume additional data, which adds to the computational costs of the client device. Furthermore, by having the centralized content management system maintain player lists for each of the accounts, the content management system could maintain just a single connection with each of the fantasy sports systems to receive updates on the fantasy lineups of multiple users, instead of each of the client devices of the users having to maintain separate, individual connections with each of the fantasy sports systems. This reduces the amount of data that is transmitted between servers and devices, thereby requiring the servers and the devices to utilize fewer computing resources.

At BLOCK 515, the server can receive a content item from a content source. As the content management system 205 is an intermediary between a plurality of content servers and a plurality of client devices, the content management system 205 is configured to receive content from the plurality of content sources. The content management system can receive a content item from one of the plurality of content sources. In some embodiments, the content item can be tagged by the content source from which the content item was received. In some embodiments, the content item can be tagged by the content management system. The tags with which the content item is tagged can be used to classify the content item. In some embodiments, the tags can include a content type tag identifying a type of content. In some embodiments, the tags can include a player tag identifying a player with which the content item is associated.

The content server from which the content item was received can associate a player tag to the content item prior to transmitting the content item to the content management server. In some embodiments, the content management system may access the content item from the content server and may associate the player tag with the content item. The content management system may parse the content item to apply one or more tags. In some embodiments, the content management system can associate one or more player tags responsive to determining that the content item relates to one or more players. In some embodiments, the content management system may parse the content item to identify if a particular player's name is included in the content item. In the case of a video content item, the content management system may generate a transcription of an audio of the video content item and parse the transcription to identify if a particular player's name is mentioned. In some embodiments, the content management system may associate a player tag with a content item if the content item includes a reference to the player identified by the player tag more than a predetermined threshold number of times.

At BLOCK 520, the server of the content management system can determine one or more player tags associated with the content item. The player tags can identify one or more players with which the content item is associated. As described above, the content item can include one or more player tags. Responsive to receiving the content item, the content management system can be configured to determine if one or more player tags are associated with the content item.

At BLOCK 525, the server of the content management system can determine that the content item includes a player tag corresponding to a player included in the list of players corresponding to the application. Responsive to determining that the content item is associated with one or player tags, the content management system can determine, for each player tag, whether the player identified by the player tag is included in the player list of the account associated with the application to which to transmit content. The content management system can then assign the content item for transmission to the client device. In some embodiments, the content management system may determine that none of the player tags associated with another content item identifies a player included in the player list of the account associated with the application to which to transmit content. The content management system may then determine that the content item is not to be included in a list of content items to deliver to the application of the client device while the configuration setting of the client device is set to apply the content filtering policy.

At BLOCK 530, the server of the content management system can transmit the content item to the client device for insertion in a content feed provided by the application responsive to determining that content item includes the player tag corresponding to a player included in the list of players corresponding to the application. The content management system can transmit the content item for insertion into a content feed of the application via a web socket connection. In some embodiments, the application can be configured to receive the content item and provide a notification within the interface of the application to indicate that a new content item has been received. In some embodiments, the content item will appear at a top of a content feed. In some embodiments, the content item will appear at a bottom of a content feed.

In some embodiments, the content management system can maintain a web socket connection with one or more applications executing on remote client devices. The content management system can be configured to establish a web socket connection between the server and the application executing on the device. In some embodiments, the content management system can establish the web socket connection responsive to receiving a request from the client device. In some embodiments, the client device can transmit the request to establish the web socket connection responsive to the application launching on the client device. The application can be configured to transmit the request responsive to being opened, launched or executed on the client device.

The content management system can further be configured to maintain state information of the web socket connection once it is established. In this way, the content management system can determine whether a client device is ready to receive notifications or content items. If the state of the web socket connection with the client device is active, the content management system can transmit the content item. In contrast, if the state of the web socket connection with the client device is not active, the content management system can add the content item to a queue of content items to transmit to the client device responsive to determining that the web socket connection between the client device and the server is active again. Stated in another way, the content management system can store a request to transmit the content item in a queue responsive to determining that there is no active web socket connection between the server and the application executing on the client device. The content management system can subsequently determine that a web socket connection between the server and the application has been established and transmit the content item to the client device responsive to determining that the web socket connection between the server and the application has been established.

In some embodiments, the content management system can be configured to maintain the player list. The content management system can determine that a second player has been added to the player list associated with the account of the user. The content management system can receive a second content item, which can be associated with a second player tag corresponding to the second player. The content management system can then add the second content item to a queue of content items to transmit to the application executing on the client device of the user and transmit the second content item to the client device for presentation in the content feed of the application responsive to determining that there is a connection between the server and the application executing on the client device.

In some embodiments, the content management system can determine that a lineup including a set of players associated with the account has expired. For instance, a lineup that the user submitted for a contest may expire once all of the sporting events related to the contest end. As such, the content management system can determine that a lineup including a set of players associated with the account has expired. Upon determining that a lineup including a set of players associated with the account has expired, the content management system can remove at least one of the set of players from the player list associated with the account. In some embodiments, the content management system can remove a player from the player list responsive to determining that none of the user's active lineups include the player.

The content management system can then identify that the content item including the second player tag that corresponds to the at least one player of the set of players that was removed from the player list and remove the second content item from the queue of content items to transmit to the application responsive to removing the at least player from the list of players. In this way, the queue of content items can only include content items that correspond to players that are included in the player list associated with the account. In some embodiments, the content management system can maintain a separate queue of content items that may include content items that would be transmitted to the client device but for the existence of the content filtering policy set by the application.

In some embodiments, the content management system can receive multiple content items from multiple content sources. The content management system can receive a first content item from a first content source in a first content format. The content management system can then select, from a plurality of content modification policies, a first content modification policy to modify the format of the first content item from the first content format to a second content format that the application executing on the client device is configured to present in the content feed. The content management system can then format the first content item from the first content format to the second content format and store the first content item in the second content format. The content management system can then transmit the first content item in the second content format for display in the content feed provided by the application.

The content management system can then receive a second content item from a second content source in a third content format. The content management system can then select, from the plurality of content modification policies, a second content modification policy to modify the format of the first content item from the third content format to a fourth content format that the application executing on the client device is configured to present in the content feed. The content management system can then format the second content item from the third content format to the fourth content format and store the second content item in the fourth content format. The content management system can then transmit the second content item to the client device in the fourth content format for display in the content feed provided by the application.

Figure 6:
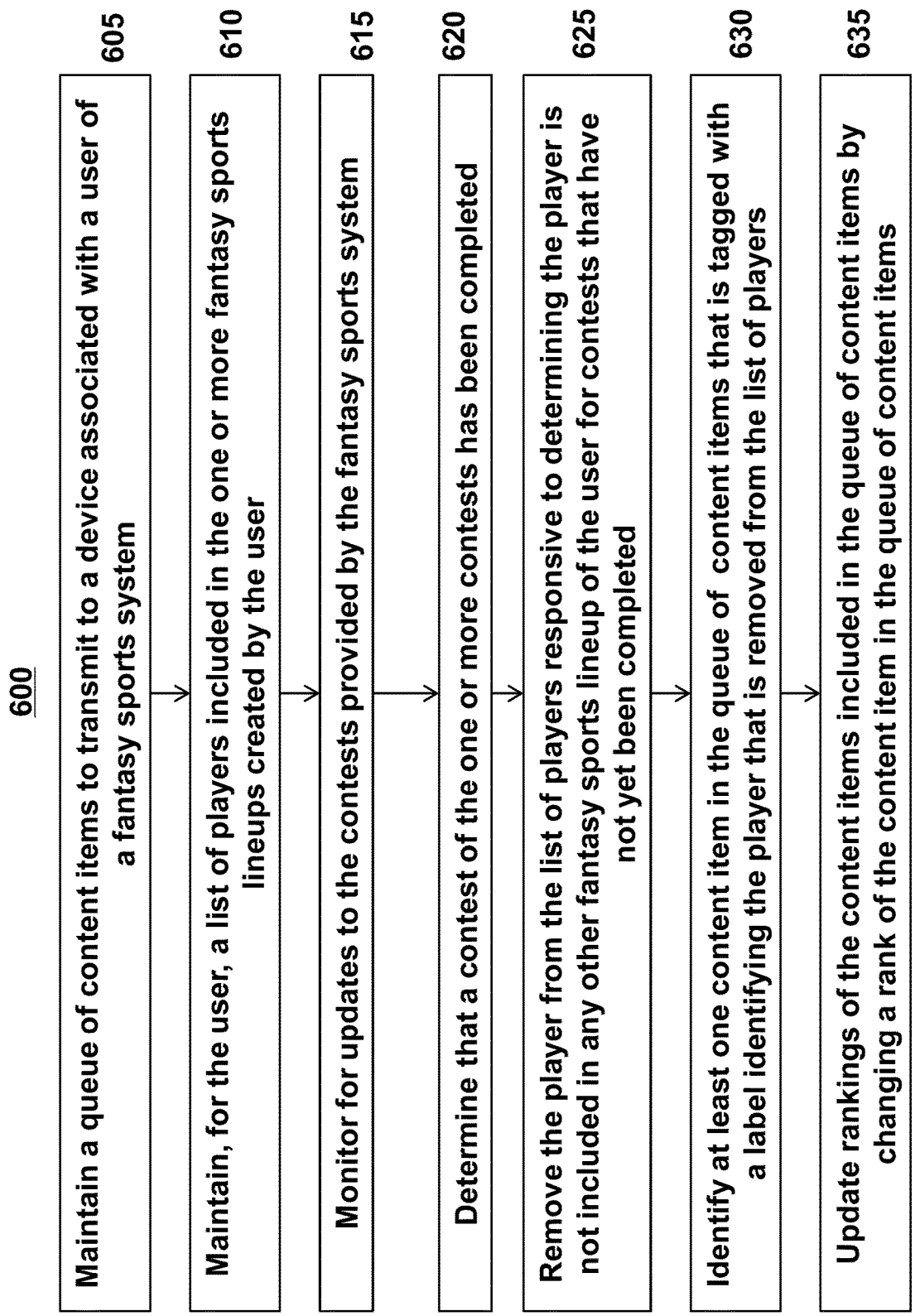
FIG. 6 illustrates a flow diagram of a method of updating a ranking of content items included in the queue of content items shown in FIG. 4.

Referring now to FIG. 6, FIG. 6 illustrates a flow diagram of a method of updating a ranking of content items included in the queue of content items shown in FIG. 4. In some embodiments, the method can include a method for updating a ranking of content items according to a dynamic content filtering policy. In brief overview, a server can maintain a queue of content items to transmit to a device associated with a user of a fantasy sports system the queue of content items including a plurality of content items will transmit the content item to the device associated with the user (BLOCK 605). The server can maintain a list of players included in the one or more fantasy sports lineups created by the user (BLOCK 610). The server can monitor for updates to the one or more contests provided by the fantasy sports system (BLOCK 615). The server can determine that a contest of the one or more contests has been completed (BLOCK 620). The server can then determine, for at least one player included in the list of players, that the player is not included in any other fantasy sports lineup of the user for contests that have not yet been completed. The server can then remove the player from the list of players responsive to determining the player is not included in any other fantasy sports lineup of the user for contests that have not yet been completed (BLOCK 625). The server can identify at least one content item in the queue of content items that is tagged with a label identifying the player that is removed from the list of players (BLOCK 630). The server can then update rankings of the content items included in the queue of content items by changing a rank of the content item in the queue of content items (BLOCK 635).

In further detail, a server of a content management system, such as the content management system 205, can maintain a queue of content items to transmit to a device associated with a user of a fantasy sports system, such as the fantasy sports system 220. The queue of content items can include a plurality of content items. Each of the content items can be tagged with a label or tag identifying a player included in one or more fantasy sports lineups created by the user for one or more contests provided by the fantasy sports system. Each content item in the queue of content items can also be ranked according to an order in which the server will transmit the content item to the device associated with the user. The order can be based on a content prioritization policy, which may be based on a freshness of the content item. In some embodiments, the content items can include one or more additional tags. These additional tags can further be used to add or remove content items from the queue of content items. For instance, content items can be tagged with tags indicating a type of content (news or scores), a subtype of content (breaking news, injuries, lineup, analysis, etc.), a format of the content (video, text), a content source of the content item (TWITTER, ESPN.com, etc.), among others.

At BLOCK 610, the server can maintain, for the user, a list of players included in the one or more fantasy sports lineups created by the user. In some embodiments, the list of players can include players that are on fantasy sports lineups of the user for contests that have not yet been completed.

At BLOCK 615, the server can monitor for updates to the one or more contests provided by the fantasy sports system. The server can maintain connections with one or more fantasy sports systems and be configured to receive communications relating to the user. In some embodiments, the communications received can indicate that the user has submitted a new lineup for a contest provided by the fantasy sports system. The communications can indicate that a contest for which the user submitted a lineup has now ended. The communications can indicate lineup changes the user made at the fantasy sports system. In some embodiments, the communications can be received responsive to the server polling the fantasy sports system. In some embodiments, the communications can be received periodically as the fantasy sports system pushes the content to the server.

At BLOCK 620, the server determines that a contest of the one or more contests has been completed. As described above, the server may receive a communication from the server that the contest has ended. In some embodiments, the server may receive communications from one or more content servers, such as a scores server, that include information indicating that certain sporting events have completed. The server may determine that a contest is completed responsive to determining that all sporting events included in a given contest have been completed. The server can determine, for at least one player included in the list of players, that the player is not included in any other fantasy sports lineup of the user for contests that have not yet been completed. By doing so, the server can determine whether or not to remove the player from the player list maintained by the server.

At BLOCK 625, the server removes the player from the list of players responsive to determining the player is not included in any other fantasy sports lineup of the user for contests that have not yet been completed. At BLOCK 630, the server identifies at least one content item in the queue of content items that is tagged with a label or tag identifying the player that is removed from the list of players. At BLOCK 635, the server updates rankings of the content items included in the queue of content items by changing a rank of the content item in the queue of content items. In some embodiments, the content item that is tagged with a label or tag identifying the player that is removed from the list of players can be removed from the queue. In some other embodiments, the priority level of the content item that is tagged with a label or tag identifying the player that is removed from the list of players is modified such that the rank of the content item is decreased. In this way, more relevant content that is related to players currently included in the player list maintained by the server for the user is sent to the client device of the server.

C. Systems and Methods for Dynamically Generating Event Cards from Message Streams As described above with respect to Section B, content management systems can provide content relating to sporting or gaming events to users. The content can include news relating to the sporting or gaming events or players competing in the sporting or gaming events as well as in-game updates relating to the sporting events.

The present disclosure relates, in part, to dynamically generating event cards from message streams. The message streams can correspond to updates relating to one or more sporting games and the event cards can be content items that have been enhanced to include information relevant to fantasy sports.

According to one aspect, a system for dynamically generating event cards from message streams includes an event generation system including one or more processors configured to receive a message of a sequence of messages from a content source. Each message of the sequence of messages is received at least a predetermined amount of time after a preceding message. The message identifies information relating to a game condition of a game. The one or more processors are further configured to determine, from the message, the game condition of the game, compare the game condition of the game with a previous game condition of the game determined based on a message preceding the message and determine one or more events that occurred in the game based on the content of the message and the comparison. The one or more processors are further configured to determine, for each event of the one or more events, an event type and individual player contributions of one or more players. The one or more processors are further configured to assign, for each event of the one or more events, to each player that contributed in the event, a points allocation corresponding to the player's contribution in the event based on the points assignment policy and the event type. The one or more processors are further configured to generate, for the events for which points allocation were assigned to at least one player, respective event cards including i) a game identifier identifying the game, ii) a game condition, iii) the event type of the event, iv) one or more players identifiers identifying the players that were assigned a points allocation, and v) a number of points in the points allocation that was assigned to each of the players that were assigned a points allocation and transmit at least one of the generated event cards to one or more remote devices for display in a content feed including a plurality of event cards corresponding to the game.

Figure 8:
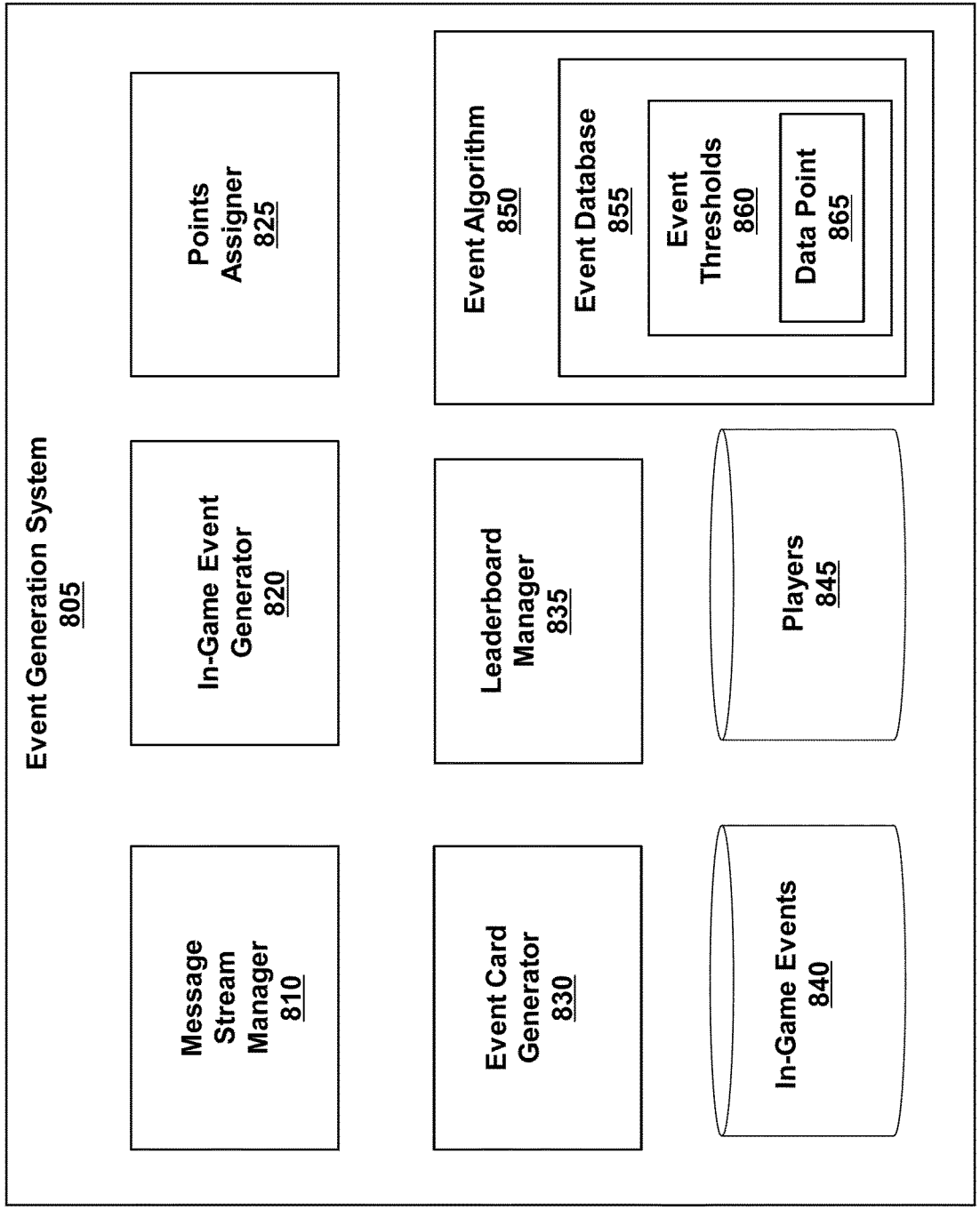
FIG. 8 is a block diagram depicting an embodiment of an event generation system that is a part of the content management system shown in FIG. 2.

FIG. 8 is a block diagram depicting an embodiment of an event generation system that is a part of the content management system shown in FIG. 2. The event generation system 805 can be a part of the content management system 205 or may otherwise be communicatively coupled to the content management system 205. The event generation system 805 can include a message stream manager 810, an in-game event generator, a points assigner 825, an event card generator 830 and a leaderboard manager 835, and an event algorithm 840. The event generation system 805 can also include an events data structure 840 configured to store in-game events and a players data structure 845 configured to store information related to one or more players associated with the in-game events stored in the events data structure 840.

The events data structure 840 configured to store in-game events and a players data structure 845 configured to store information related to one or more players associated with the in-game events stored in the events data structure 840. The events data structure 840 can be stored on a server of the event generation system 805 or can be accessed by the event generation system 805.

The message stream manager 810 can comprise components, subsystems, modules, scripts or one or more sets of computer-executable instructions and can be configured to manage messages received from one or more content sources, such as the content servers 215a-n shown in FIG. 2. The messages can include content related to one or more games that are about to begin, that are currently in progress, that have recently ended, or games that have otherwise been completed. The messages can be received periodically from the content sources. For example, the messages can be received at regularly occurring intervals, such as but not limited to every 1 second, 2 seconds, 3 seconds, 4 seconds, 5 seconds, 6 seconds, 7 seconds, 8 seconds, 9 seconds, 10 seconds, 15 seconds, 20 seconds, 25 seconds, 30 seconds, 45 seconds, 1 minute, ten minutes, thirty minutes, among others. In some embodiments, the messages can be received responsive to one or more events in one or more games. For example, the messages can be received responsive to a game finishing, halftime or end or a period during a game, and/or a change in score during a game. In some embodiments, the messages can be received responsive to a push by a third-party content server configured to provide periodic updates to a status of the game. The messages can be part of a message stream that includes a sequence of messages that are provided over the course of a game. The messages can include information that the event generation system can use to identify one or more in-game events that occurred in the game. An in-game event can be any event that can be derived from the information provided in the messages from by the content source. For instance, in a football game, the in-game events can include each and every play that takes place in the football game. In addition to each play, other in-game events can include injuries to players, penalties and fouls awarded in the game, among others.

The message stream manager 810 can be configured to establish ports, communication channels or other connections with one or more content sources to receive messages for each of a plurality of games. The message stream manager 810 can receive, for each game, a separate message stream including a plurality of messages. Each of the plurality of messages can be transmitted on a periodic basis. The messages can be spaced apart by predefined intervals. The messages can include message identifiers that can be used to identify an order of the messages as well as the game to which the message corresponds.

The event algorithm 850 can include a process or set of rules to be executed by one or more processors of the event generations system 805. For example, the event algorithm 850 can include a process or set of rules to be executed by one or more processors of the event generations system 805 to transform time based data received from one or more messages of a sequence of messages to event based data. The event algorithm 850 can include one or more event databases 855. For example, the event algorithm can include a single event database 855 or at least one event database 855 for each sport or competition (e.g., football event database 855, basketball event database 855). The event database 855 can include a set of data stored for the event generation system. For example, the event database 855 can store data received or extracted from one or more messages of a sequence of messages to event based data. The event database 855 can store data corresponding to a game, game conditions and/or a game status. The event database 855 can store data corresponding to one or more events that may occur during a game or competition. The event database 855 can include one or more event thresholds 860. For example, the event generation system 805 can generate event thresholds 860 for each event type or event stored in the event database 855. The event thresholds 860 can indicate when a particular event has occurred. For example, the event or event type can include one or more data points 865. The data points 865 can correspond to point values for the respective event or event type. For example, when a message is received that includes changes to one or more data points 865 for a particular player and/or a particular play, it may indicate that at least one event has occurred. The data points 865 can correspond to individual statistics of a player and/or team in a game. For example, a pass completion data point 865, receiving yards data point 865, pass reception data point 865, and/or change of score data point 865 can correspond to a touchdown event during a football game. Thus, an event threshold 860 for a touchdown may include one or more of these data points 865. An event threshold 860 can include a single data point 865 or multiple data points 865.

Figure 9:
FIG. 9 illustrates a plurality of in-game events that occur during a game.
Figure 10:
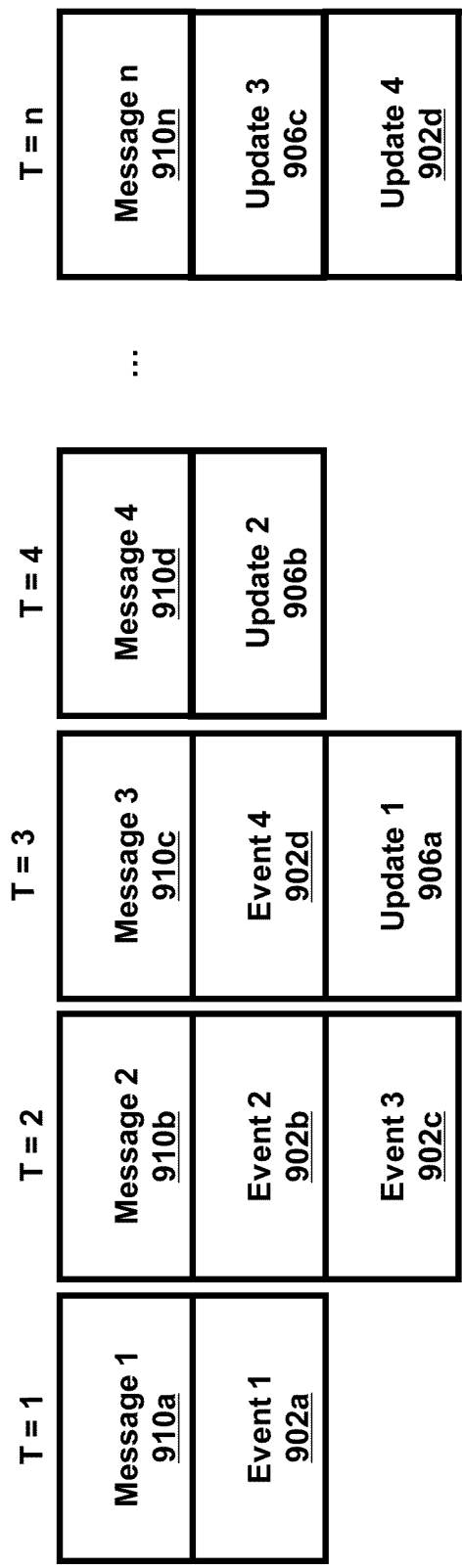
FIG. 10 illustrates a sequence of messages including information pertaining to the in-game events shown in FIG. 9.

Referring also briefly to FIG. 9 and FIG. 10, FIG. 9 illustrates a plurality of in-game events that occur during a game and FIG. 10 illustrates a sequence of messages including information pertaining to the in-game events shown in FIG. 9. The events 902a-n are events that occur during a game. These events can be parsed out from messages 910a-910n that are received from one or more content sources, such as content servers 215. The messages can be received by the message stream manager 810 at various times throughout a game and may be transmitted according to a transmissions schedule defined by the content source. In some embodiments, the messages can be received responsive to the message stream manager 810 requesting messages from the content source.

The in-game event generator 820 can comprise components, subsystems, modules, scripts or one or more sets of computer-executable instructions and can be configured to identify one or more in-game events from the messages. The messages can include information that identifies a game condition of the game. For example, the game condition of the game can refer to or correspond to a current game condition or a most recent game condition. The game condition can reflect a play that just happened in the particular game and thus, include the most recent or up to date information corresponding to the game. The game condition of the game can include information that can be used to determine the status of the game or current status of the game. For instance, in football, the game condition of a football game can identify a game clock (e.g., current game clock), a ball position (e.g., current ball position), which down it is, a score of the game (e.g., current score of the game), as well as statistics of one or more players, among others. In some embodiments, the statistics may be updated statistics of each player. In some embodiments, the message may include statistics only related to players involved in one or more events that occurred in the game since the previous message was transmitted by the content source. In some embodiments, the message may include statistical information related to only players whose statistics were updated since the previous message.

Each message can include information pertaining to one or more events 902 and information pertaining to one or more updates to the one or more events 902. In some embodiments, the updates included in the message can be updates to events that were included in a previous message. As shown in FIG. 10, a message 1 902a can include information pertaining to a first event 902a. A message 2 910b received at time=2 includes information pertaining to event 2 902b and event 3 902c. Message 3 910c can include information pertaining to event 4 902d and can include an update 906a pertaining to the event 1 902a. Message 4 910d can include an update 906b pertaining to the event 2 902b. An example of an update can include a change in a statistic of a player, a reversal of a previous event (such as a touchdown), or a player correction in case the event, upon replay for example, is attributed to another player. In some embodiments, the content source may not be able to provide all of the information relating to an event at the time the message is being transmitted so any information that was not able to be included in the message may be included in a subsequent message. The update may be flagged such that the in-game event generator 820 can determine which event the update is associated with.

To manage the statistical information included in the messages, the in-game event generator 820 may maintain, for each player, one or more statistics that are included in the messages from the content source. The players data structure can include the list of players in the game. The players data structure can maintain, for each player, statistics of the player. As messages are received, the in-game event generator 820 can parse the messages to determine if the messages include any information that can be used to determine if any of the players' statistics have been updated. If the message includes information relating to a player, the in-game event generator can use the information to update the statistics of the player.

It should be appreciated that the in-game event generator can maintain different statistics for different positions. Using football as an example, statistics for quarterbacks can include passes attempted, passes completed, passes intercepted, and touchdowns. Statistics for running backs can include total carries, fumbles, total yards run, among others. The in-game event generator can update the statistics of each player based on the player's position.

The in-game event generator 820 can extract, from the message, a game condition of the game. The in-game event generator 820 can maintain a set of parameters corresponding to the game condition, such as parameters for each of a game clock, a ball position, which down it is, a score of the game. The in-game event generator 820 can also maintain a set of parameters corresponding to a previous game condition. The values of the parameters for the previous game condition can be updated as new messages are received. In some embodiments, when a game begins, the values of the parameters of the game condition and the previous game condition can be initialized. As a subsequent message is received and the in-game event generator determines values for the parameters of the game condition, the in-game event generator can update the values of the parameters of the previous game condition to match the values set for the game condition. The in-game event generator 820 can then update the values of the parameters of the game condition to new values based on the information included in the most recently received message. In this way, as a subsequent message is received, the game condition of the game determined from the message is set to a previous game condition and the game condition determined from the subsequent game condition is set to the game condition of the game.

Each time a message related to the game is received, the in-game event generator 820 can compare the values of the parameters of the game condition of the game to corresponding values of parameters of the previous game condition. By comparing the values of the game condition to those of the previous game condition, the in-game event generator 820 can determine one or more events that may have occurred. In some embodiments, the in-game event generator 820 may also utilize the statistical information maintained by the in-game event generator 820 in the players data structure 845 to determine the one or more events that occurred since the last message was received The in-game event generator 820 can further be configured to determine, for each event of the one or more events determined to have occurred since the last message, an event type and individual player contributions of one or more players. The in-game event generator can determine the event type by analyzing the game conditions to previous game conditions as well as changes in the statistics of each of the players since the last message was received.

For instance, the in-game event generator can determine that one team scored a field goal if the game score has changed by three points. Similarly, the in-game event generator can also determine this by determining a change in the statistics of the kicker that scored the field goal. Additional details about the field goal, such as the distance of the kick can be computed by determining the ball position prior to change in the score. This could also be determined by comparing the total yards a kicker has kicked prior to and after the kick.

In some embodiments in which multiple events have occurred since the previous message was received, the in-game event generator may compare the statistics of various players and the difference in the game condition (score, ball position, game clock) to determine each event included in the message.

The in-game event generator can also determine, for each of the one or more events determined to have occurred since the last message, the contributions of one or more players. In some embodiments, the in-game event generator 820 can determine which players contributed to the event based on a change in the statistics of those players since the last message. In some embodiments, the in-game event generator 820 can maintain a game statistics data structure, which may be the same as the players data structure 845, which is updated after each received message. The game statistics data structure can maintain a list of the statistics of each player. In some embodiments, the game statistics data structure can be initialized for the game and include a list of the players that are eligible to play in the game. The in-game event generator 820 may receive the lineups of both teams in a game from the same content source that provides the messages including the in-game events or from a separate content source. Upon initializing the game statistics data structure, the in-game event generator can update the statistics of each player based on information included in each of the messages. In some embodiments, the in-game event generator can update the statistics of each player based on information received from another content source that publishes game statistics.

The points assigner 825 can comprise components, subsystems, modules, scripts or one or more sets of computer-executable instructions and can be configured to assign, for each event of the one or more events, to each player that contributed in the event, a points allocation corresponding to the player's contribution in the event. The points assigner 825 can determine the points allocation for each of the players that contributed in the event based on a points assignment policy and the event type. The points assignment policy can include one or more rules for assigning fantasy points to players. In some embodiments, the points assignment policy is established by the fantasy sports system. In some embodiments, a user of the application can select which fantasy sports system's point assignment policy to apply.

The points assigner 825 can be configured to determine whether a player's contribution in the event is greater than a threshold value. The threshold value can be a predefined value based on the event type. For example, the threshold value can correspond to a point value scored by or associated with the respective player. The threshold value can be established based in part on an event type. The threshold values for different event types can be different. The threshold values for one or more different event types can be the same. The threshold values can be established by the event generation system or a user of the event generation system. Moreover, the amount of points to be assigned to each player can be determined using the points assignment policy.

Figures 13A, 13B:
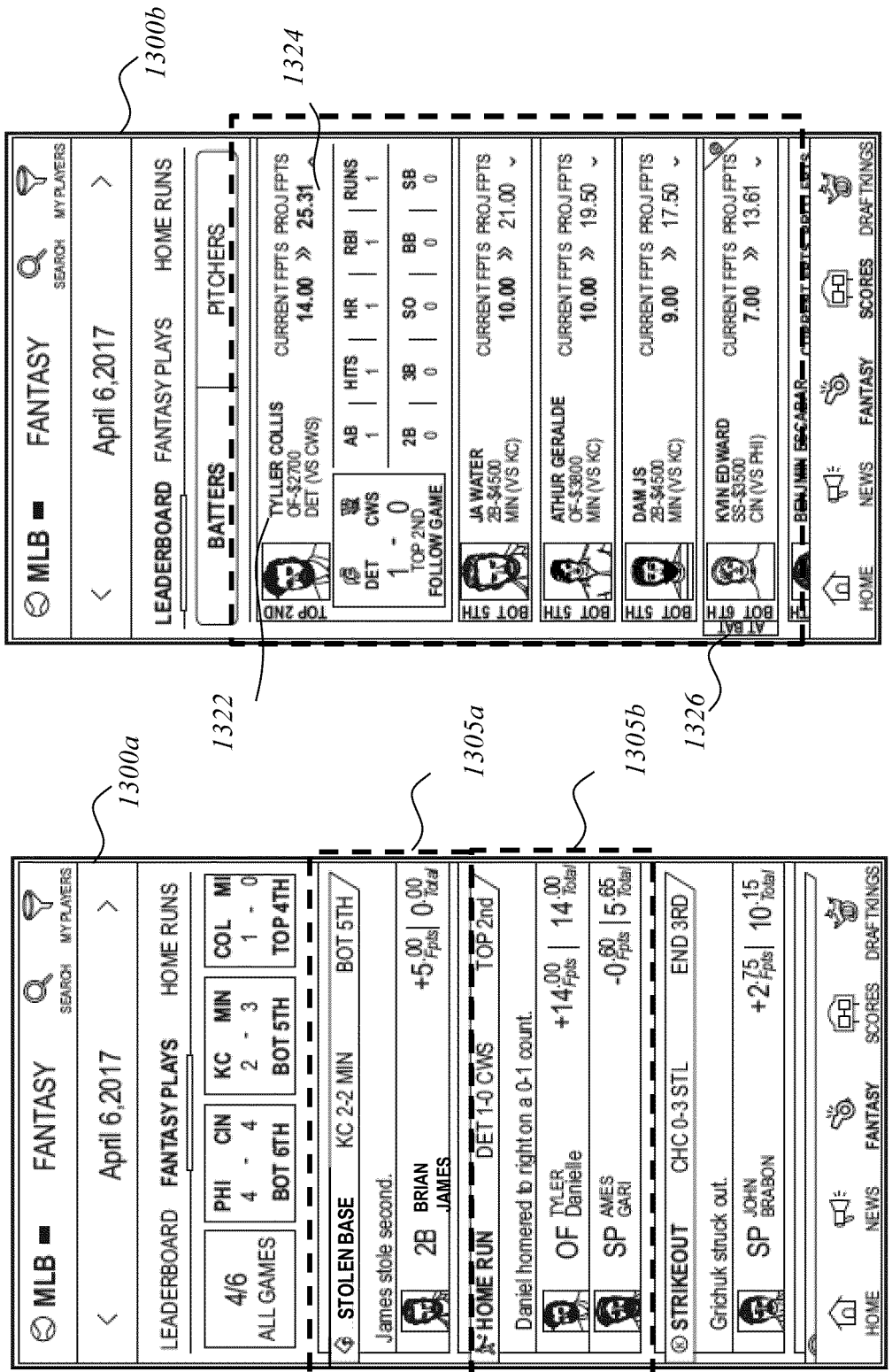
Figures 14A, 14B:
Figure 14H:
Figure 14G:

Referring now also briefly to FIG. 13A, a screenshot 1300a of a user interface displayed within an application in communication with the content management system 205 and the event generation system 805 is shown. The screenshot 1300a displays a first event card 1305a and a second event card 1305b. As can be seen, in event card 1305a relating to baseball, the event type is a stolen base and the player Brian James that stole the base was assigned 5 points in accordance with the points assignment policy by the points assigner 825. Similarly, in the event card 1305b, the event type is a home run and the player that hit the home run was assigned 14 points, while the pitcher that pitched the ball was assigned −0.6 points.

After the points assigner 825 assigns points to the appropriate players, the points assigner 825 can update the players data structure 215, which maintains a points tally of each of the players by adding the points assigned to each of the appropriate players. In the case of the pitcher that was assigned −0.6 points, his points tally decreased by 0.6 to become 5.65 as shown in FIG. 13A.

Figure 11:
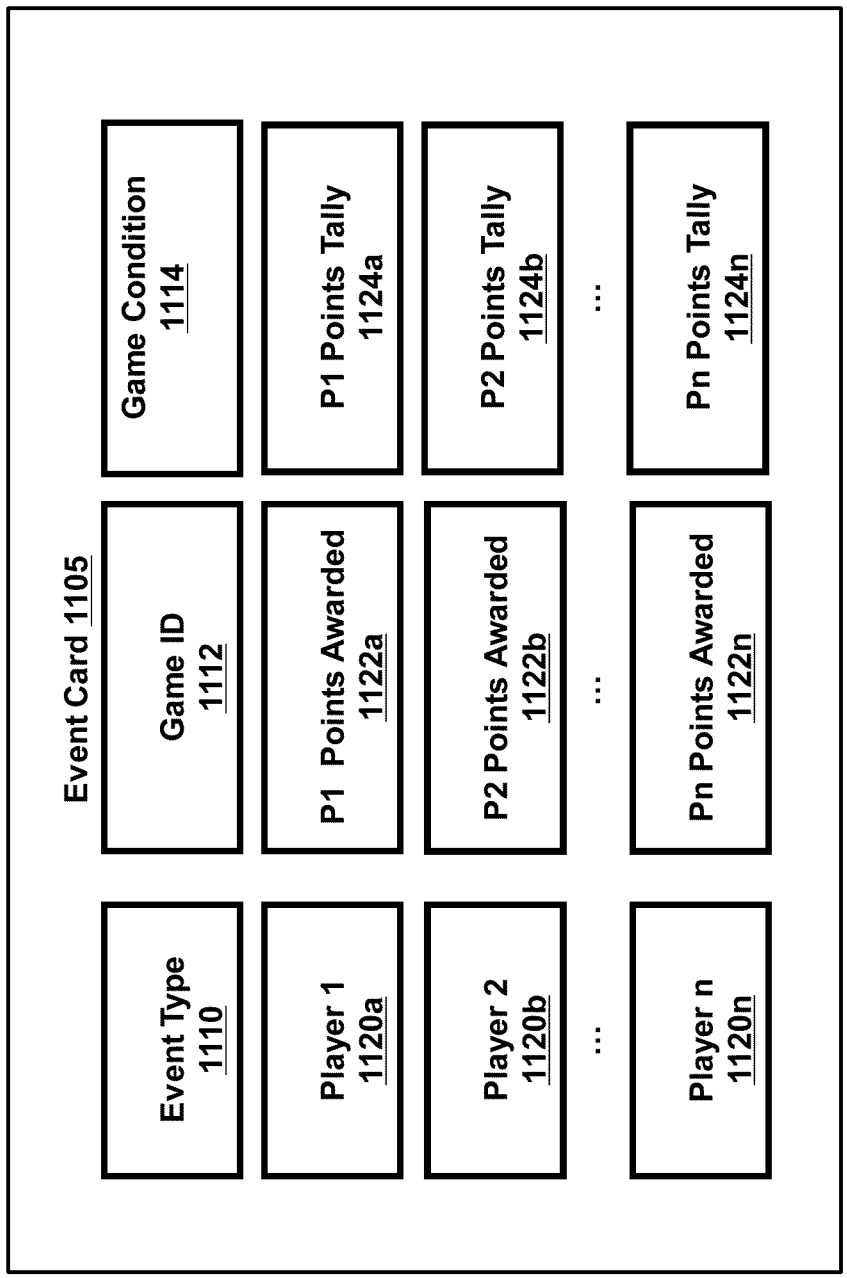
FIG. 11 illustrates an event card generated by the event generation system relating to an in-game event.

The event card generator 830 can comprise components, subsystems, modules, scripts or one or more sets of computer-executable instructions and can be configured to generate, for the events for which points allocation were assigned to at least one player, respective event cards, such as event cards 1305a and 1305b shown in FIG. 13A. Referring now also to FIG. 11, FIG. 11 illustrates an event card 1105 generated by the event generation system relating to an in-game event. In some embodiments, the event card 1105 can include an event type 1110, a game identifier or descriptor 1112, a game condition 1114, and for each player 1120a-n that contributed in the event (meaning they were assigned points for the event), a number of points awarded 1122a-n and a points tally 1124a-n. The event type 1110 can be any event for which fantasy points can be awarded to one or more players. The game identifier 1112 can identify the teams that are playing the game (Kansas City versus Minnesota in the event card 1305a shown in FIG. 13A). The game condition 1114 can include a current score of the game, an indication of how much of a game is remaining (game clock, innings played, hole number (in golf), etc.).

Once the event card generator generates the event card, the event generation system 805 can be configured to determine which devices to which to transmit the card. In some embodiments, the event generation system 805 can be configured to transmit event cards to a remote device of a user responsive to either receiving a request from an application executing on the remote device of the user or determining that there is an active connection (for example, a web socket connection) established between the event generation system 805 and the remote device.

In some embodiments, the application to which to transmit the event card may have a configuration setting enabled on the application, which is communicated to the event generation system 805. The configuration setting can be set to indicate that a content filtering policy 374 should be applied. The content filtering policy 374 can be based on a list of players included in the player list of the user. The player list, such as the player list 362 shown in FIGS. 3 and 4, of the user can be dynamically updated as the user creates, removes or modifies one or more lineups at one or more fantasy sports systems 220. Moreover, as contests hosted by the fantasy sports systems 220 are completed, players included in lineups submitted for those contests can be removed from the player list of the user (assuming no other active lineup of the user includes the player being removed).

In some embodiments, the event generation system 805 can select one or more devices to which to transmit the content based on the players included in the event card. The event generation system 805 can be configured to determine a list of devices having an active connection with the event generation system 805 and determine, from this list of devices, a set of devices associated with player lists that include at least one player to which points are assigned for the event. Responsive to determining that one of the players to which the event card is assigning points to is included in the player list associated with the device, the event generation system 805 can determine to transmit the event card to the remote device.

In embodiments in which a remote device has not set a configuration setting for filtering content based on the player list of the device, the event generation system 805 can transmit the event card to the remote device responsive to determining that an active connection with the device is present.

The event card can be received by the remote device and the application, such as the application 212 executing on the remote device, such as the device 210a-n, can be configured to display the event card in a content feed of the application. In some embodiments, the content feed can be configured to display all event cards relating to a particular sport. In some embodiments, the content feed can be configured to display event cards relating to a particular game. In some embodiments, the content feed can be configured to display event cards relating to players included in the player list of the user.

By displaying the event cards in the content feed of applications at remote devices of users, users are able to get real-time or near real-time, in-game updates on an event-by-event basis. Moreover, these events are specifically generated based on the assignment of points to one or more players. In this way, the event generation system 805 can be configured to only transmit content responsive to an event that includes a point assignment.

The event generation system 805 can reduce the amount of computing resources a user's computing device or remote device utilizes to display data. For example, receiving and displaying content at the user's computing device utilizes computing resources, such as processing power of the computing device, battery of the computing device as well as occupies real estate on the display screen of the computing device that could otherwise be consumed by content that is more relevant to the user. As such, there is a desire to reduce the amount of content, or at least contextually irrelevant content, that is delivered to the user's computing device. For example, a user would typically need to utilize multiple sites, multiple resources, multiple content servers or otherwise be connected with several content servers to receive data for multiple different games or events. Each site, resource or content server utilizing multiple resources and power on the user's computing device to receive data. Further, the user would typically need to repeatedly poll or refresh each of the sites, resources or content servers to update the content received, further increasing the resource and power demands on the user's computing device.

The event generation system 805, as described herein, can reduce the rate at which a user's computing device consumes battery power and/or resources by providing the event cards in a single content feed and providing real-time or near real-time, in-game updates on an event-by-event basis. Thus, the user's computing device does not need to be connected to multiple sites, multiple resources, and/or multiple content servers. Further, the user's computing device does not need to repeatedly poll or refresh each of the sites, resources or content servers to update the content received, thus reducing the amount of battery power consumed and resources utilized.

Moreover, in other systems, the user's computing device would need to access multiple sites, multiple resources, and/or multiple content servers to retrieve data corresponding to individual games or events. Thus, the user is typically provided contextually irrelevant data in addition to the individual game or event the user is actually looking for and interested in. It should be appreciated that each contextually irrelevant content item that is transmitted to the user's computing device has an associated computing resource cost, that although individually may seem trivial, results in wasting a large amount of computing resources of the user's computing device. The event generation system 805 can provide event cards to a user's content feed that is contextually relevant. For example, the event cards can be generated based in part on sports, teams and/or individual players the particular user has an interest in. Therefore, the event generation system 805 can reduce the number of contextually irrelevant content items that are transmitted to client devices and can reduce the amount of computing resources that are wasted or expended to transmit such content items. In addition, the user's viewing experience is disrupted and suboptimal if the user is constantly or even periodically switching between sites or applications to access data related to the same game or multiple games.

In some embodiments, the event generation system 805 can be configured to transmit event cards for which no points were assigned to players along with content in which points are assigned. In such embodiments, the event cards for which no points were assigned do not include any point allocations to players.

The leaderboard manager 835 can comprise components, subsystems, modules, scripts or one or more sets of computer-executable instructions and can be configured to maintain a leaderboard of players. The leaderboard can be based on a number of points assigned to each player. The leaderboard is not limited to a single game but may be applicable to all games happening on the same day, week, or other time period. In this way, the leaderboard can be used to identify which players are the best performing players in the fantasy sports system for a particular day, week, or other time period. In some embodiments, the leaderboard can be based on positions or roles of the players.

Figures 13C, 13D:
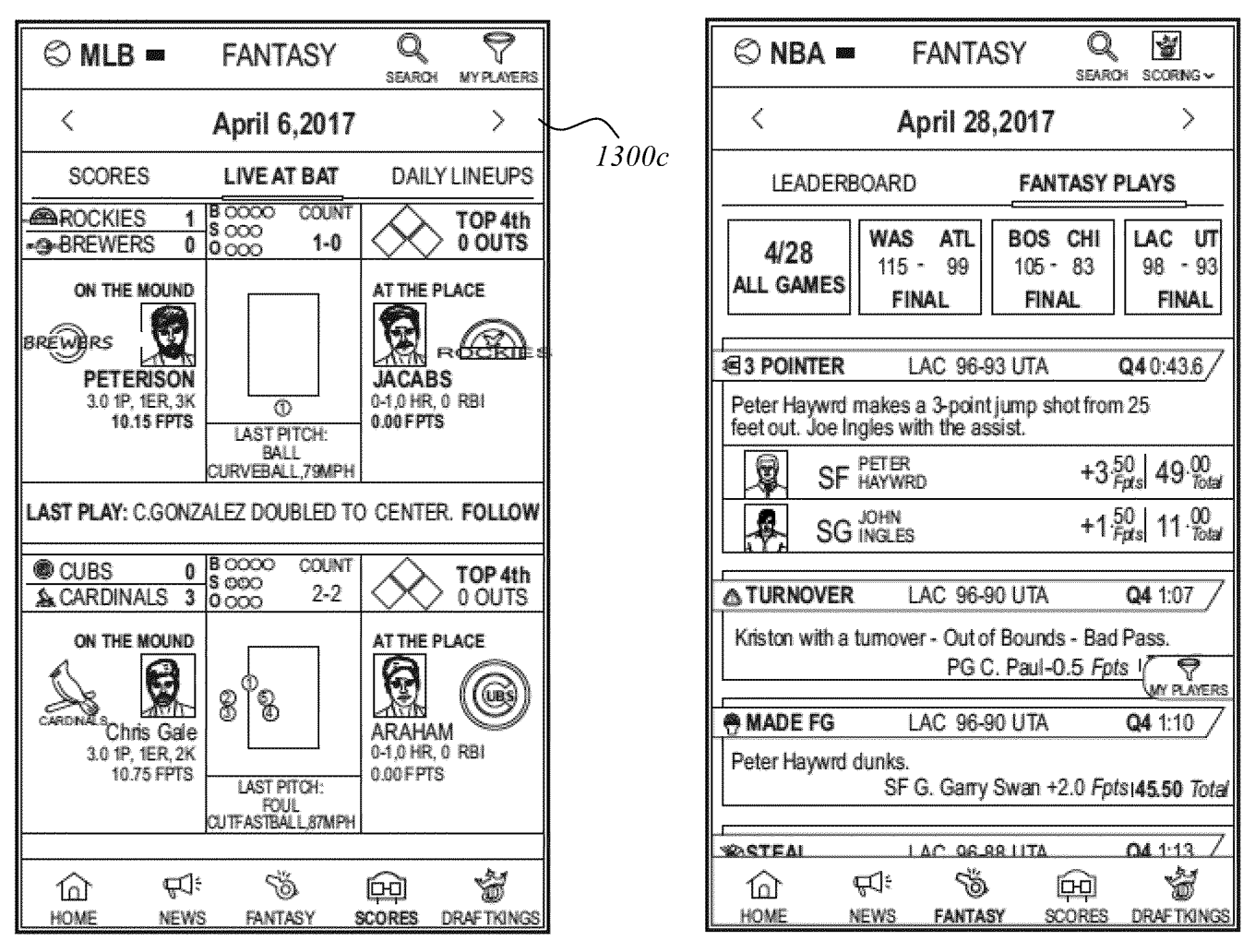
Figures 13E, 13F:
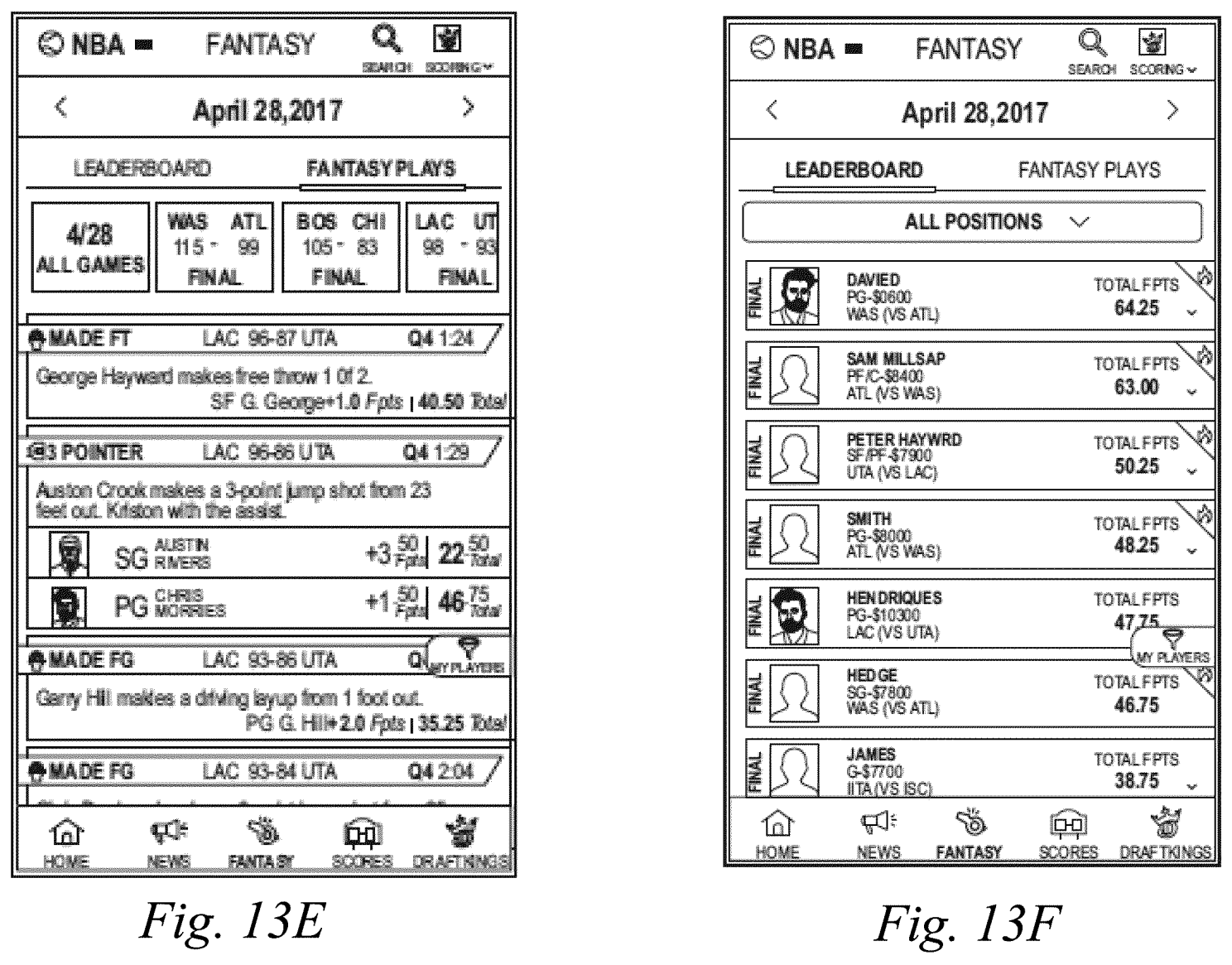

Referring briefly to FIG. 13B, a screenshot of a leaderboard is shown. The leaderboard 1320 includes a list of the top performing batters 1322. As shown in FIG. 13B, the top batter is Tyller Collis based on the 14 points assigned to him. In some embodiments, the top batter can be determined based on the projected number of points the batter will earn at the completion of the game. The projection (shown as 1324) can be based on a number of innings played and a number of innings remaining. As shown in the leaderboard 1320, an indication of the inning of the game in which the player is competing is also shown. Furthermore, if a particular player in the leaderboard is "at-bat", an indication 1326 is provided such that a user can view the user's performance in real-time as shown in the screenshot 1300c shown in FIG. 13C.

The points assigner 825 can further be configured to adjust points based on other rules of the points assignment policy. In some embodiments, additional points can be assigned to players based on their aggregated statistics independent of the points assigned on a per event basis. For instance, if a running back rushes for over a 100 yards, the points assigner 825 can be configured to assign additional points for rushing over 100 yards. In some embodiments, the points assigner 825 can determine that a player qualifies for additional points due to their aggregated statistics during a particular event. For instance, if a running back rushes for 6 yards and now his total yards run is 102 yards, the points assigner 825 can assign points not only for the 6 yard run but also for reaching the 100-yard mark. In some embodiments, the points assigner can also remove points in the event that the aggregate statistics of the player no longer qualify them for points based on the aggregated statistics. For instance, if the running back then rushes for 5 negative yards putting his total yards rushed at 97, the points assigner can assign a negative point value that is based on the sum of the loss of 5 yards and the bonus points awarded for rushing over 100 yards.

Figure 12:
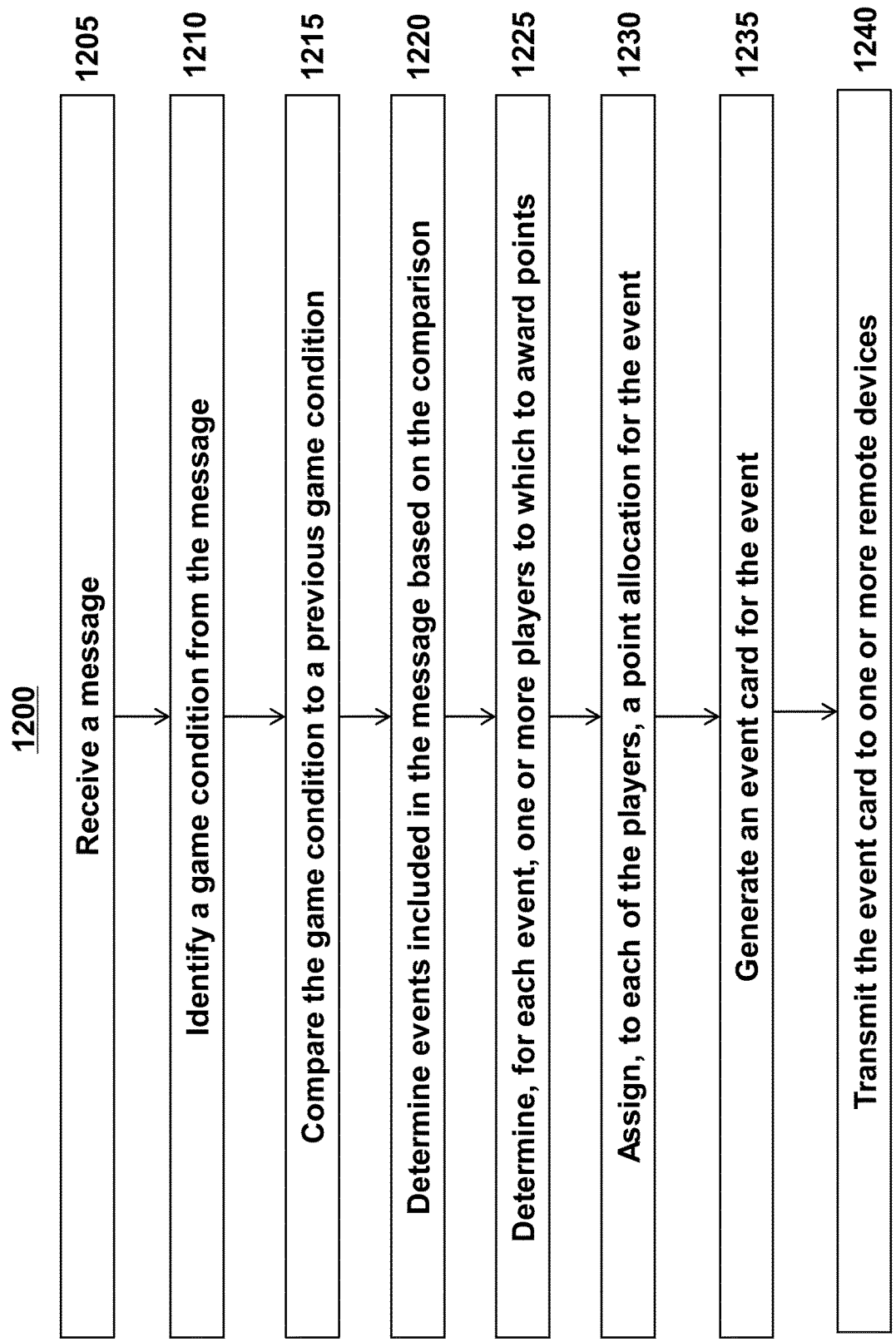
FIG. 12 is flow diagram of a method of dynamically generating event cards from message streams.

Referring now to FIG. 12 is flow diagram of a method of dynamically generating event cards from message streams. In brief overview, one or more servers of an event generation system can receive a message of a sequence of messages from a content source (BLOCK 1205). The event generation system can determine, from the message, the game condition of the game (BLOCK 1210), compare the game condition of the game with a previous game condition of the game determined based on a message preceding the message (BLOCK 1215) and determine one or more events that occurred in the game based on the content of the message and the comparison (BLOCK 1220). The event generation system can determine, for each event of the one or more events, an event type and individual player contributions of one or more players (BLOCK 1225). The event generation system can assign, for each event of the one or more events, to each player that contributed in the event, a points allocation corresponding to the player's contribution in the event based on the points assignment policy and the event type (BLOCK 1230). The event generation system can generate, for the events for which points allocation were assigned to at least one player, respective event cards including i) a game identifier identifying the game, ii) a game condition, iii) the event type of the event, iv) one or more players identifiers identifying the players that were assigned a points allocation, and v) a number of points in the points allocation that was assigned to each of the players that were assigned a points allocation (BLOCK 1235). The event generation system can transmit at least one of the generated event cards to one or more remote devices for display in a content feed including a plurality of event cards corresponding to the game (BLOCK 1240).

In further detail, at BLOCK 1205, the event generation system can receive a message of a sequence of messages from a content source. Each message of the sequence of messages can be received at least a predetermined amount of time after a preceding message. The predetermined amount of time can correspond to a regularly occurring interval, such as but not limited to every 1 second, 2 seconds, 3 seconds, 4 seconds, 5 seconds, 6 seconds, 7 seconds, 8 seconds, 9 seconds, 10 seconds, 15 seconds, 20 seconds, 25 seconds, 30 seconds, 45 seconds, 1 minute, every ten minutes, every thirty minutes. The predetermined amount of time can be determined by the event generation system based in part on an event type. For example, the predetermined amount of time can correspond to one or more events in one or more games. The predetermined amount of time can correspond to, but not limited to, an amount of time between different plays in a football game, an amount of time between pitches or at bats in a baseball game, an amount of time between possessions in a basketball game. In some embodiments, the predetermined amount of time can correspond to game finishing, halftime or end of a period during a game, and/or a change in score during a game. The predetermined amount of time can be determined and established by the event generation system or a user of the event generation system. The predetermined amount of time can be set by the content source from which the messages are received. The message identifies information relating to a game condition of a game. The event generation system can receive multiple messages corresponding to multiple games or a single message that includes information relating to multiple games.

At BLOCK 1210, the event generation system can determine, from the message, the game condition of the game. The game condition of the game can include a current score of the game, an indication of how much of a game is remaining (game clock, a current play clock status, innings played (or inning status), hole number (in golf), among others. As used herein sometimes, current game condition or information can indicate a game condition or information at the time the data stream was transmitted. As used herein sometimes, current game condition or information can indicate a game condition or information at the time the data stream was received. The event generation system can extract game condition information (e.g., current game information) from one or more messages of the sequence of messages to determine the game condition of the game or to update the game condition of the game. The event generation system can maintain a set of parameters corresponding to the game condition. The parameters can be established based at least in part on the event type and correspond to events within the game. For example, the parameters for the game condition of a football game can include a current game clock time or most recent game clock time, a current ball position or most recent ball position, which down it is, and/or a current score of the game or most recent score of the game. The event generation system can also maintain a set of parameters corresponding to a previous game condition. The values of the parameters for the previous game condition can be updated as new messages are received.

At BLOCK 1215, the event generation system can compare the game condition of the game with a previous game condition of the game determined based on a message preceding the message. As subsequent messages are received, the event generation system can update parameter values corresponding to the game condition to values corresponding to the most recently received message. Similarly, the event generation system can update parameter values corresponding to a previous game condition to values from the second most recently received message. In this way, both the game condition parameter values and the previous game condition parameter values are updated as new messages are received. For example, when a game begins, the values of the parameters of the game condition and the previous game condition can be initialized. As a subsequent message is received, the event generation system can determine or update values for the parameters of the game condition. The event generation system can update the values of the parameters of the previous game condition to match the values set for the game condition. The event generation system can then update the values of the parameters of the game condition to new values based on the information included in the most recently received message. Thus, as a subsequent message is received, the game condition of the game determined from the message is set to a previous game condition and the game condition determined from the subsequent game condition is set to the game condition of the game.

At BLOCK 1220, the event generation system can determine one or more events that occurred in the game based on the content of the message and the comparison. The event generation system can determine the events based on information included in the message or information related to statistics of the game and/or players. The statistics related to the game and/or players may be received from one or more different content sources. For example, each time a message related to the game is received, the event generation system can compare the values of the parameters of the game condition of the game to corresponding values of parameters of the previous game condition. By comparing the values of the game condition to those of the previous game condition, the event generation system can determine one or more events that may have occurred. The events can be unique to a particular game type. For example, the events for a baseball game may include, but not limited to, a run scored, a home run, an end of an inning, or a strikeout. In some embodiments, the event generation system may also utilize the statistical information maintained by the event generation system in the players data structure to determine the one or more events that occurred since the last message was received.

At BLOCK 1225, the event generation system can determine, for each event of the one or more events, an event type and individual player contributions of one or more players. For example, each event type can include one or more different events from another, different event type. The event generation system can extract the one or more events in the message to determine an event type corresponding to the message. The event generation system can generate and store sample events for each event type. Thus, responsive to receiving the message, the event generation system compare the one or more events in the message to the sample events for each event type to determine the event type. The event generation system determines the event type to determine whether any points are to be assigned based on the event type. Each event type can have a different points assignment policy or one or more event types may have similar points assignment policies. In some embodiments, the event generation system can compare the event type to a points assignment policy to determine if points are to be assigned for the event type. The event generation system can also determine individual player contributions for one or more players. The individual player contributions can be determined using the statistics of the players and comparing them to statistics of the players prior to the event. In some embodiments, the event generation system can compare the statistics of the players to previous statistics to determine the players' contributions for the particular event.

At BLOCK 1230, the event generation system can assign, for each event of the one or more events, to each player that contributed in the event, a points allocation corresponding to the player's contribution in the event based on the points assignment policy and the event type. In addition, the event generation system can assign points based on the aggregated statistics of the player. In this way, if a player achieves a statistical threshold by virtue of his performance in the particular event, the event generation system can assign points for both the player's contribution in the event as well as the player's aggregated statistic. The points allocation can correspond to one or more events that respective player was involved in during a game. For example, the points allocation can be responsive to the player performing one or more events (e.g., score a touchdown, hit a home run, hit a free throw, etc.) during a game. The points allocation can include positive points or negative points. At BLOCK 1235, the event generation system can generate, for the events for which points allocation were assigned to at least one player, respective event cards including i) a game identifier identifying the game, ii) a game condition, iii) the event type of the event, iv) one or more players identifiers identifying the players that were assigned a points allocation, and v) a number of points in the points allocation that was assigned to each of the players that were assigned a points allocation. The event generation system can store each event in the events data structure 840. The event generation system can assign an event identifier to each event. The event generation system can update a previously generated event that is stored in the events database responsive to receiving an update to the event in a subsequent message. In some embodiments, the event generation system can transmit an updated event card or instructions to modify a previously transmitted event card to one or more remote devices to which the event card was transmitted.

The event generation system can transform the time based data from the content servers to event based data to generate the event cards. For example, each of the messages from the sequence of messages can include game condition data that is time based data. The game condition, as described above, can include but not limited to, a current score of the game at a particular time in the game, an indication of how much of a game is remaining (game clock, a current play clock status, innings played (or inning status), hole number (in golf), among others. Thus, the data extracted from the messages can be time based or associated with at least one point in time in a particular game. The event generation system can include an event algorithm to transform the time based data into event data to determine if one or more events occurred and to generate the event cards.

The event algorithm of the event generation system can include a database that stores event thresholds for each event. The event thresholds can indicate that a particular event has occurred. Each event can have an event threshold that includes one or more data points. Thus, when a message is received that includes changes to one or more data points for a particular player and/or a particular play, it may indicate that at least one event has occurred. For example, an event threshold for a completed reception can include an increase in a receiving yards data point for a receiver and an increase in a pass receptions data point for the same reception. An event threshold for a completed three point basketball shot can include an increase in a point total data point for a player and an increase in a completed three point attempts data point for the same point. In some embodiments, the event thresholds can include a single data point (e.g., made field goal). In other embodiments, the event thresholds can include multiple data points (e.g., two or more). The event thresholds can vary for each sport, game, event, positon of a player, and/or player. The event thresholds can be established by the event generation system or by a content source providing the data.

To transform the time based data to event based data, the event generation system can apply the data extracted from one or more messages to the event algorithm. The event algorithm can process the data from the one or more messages to transform the time based data to event based data. For example, the event algorithm can identify if any data points have modified in value responsive to receiving the time based data from the one or more messages. The event algorithm can extract each data point that has had a change in value (e.g., increase, decrease). The event algorithm can compare the data points to the event thresholds to identify which data points correspond to which event thresholds. In some embodiments, a data point can correspond to a single event threshold or multiple event thresholds. The event algorithm can group the data points based in part on a sport, a game, a position of a player, and/or a particular player. The event algorithm can group the data points based in part on the one or more event thresholds the respective data point corresponds to. The data points can be included in multiple event threshold groups. For example, in a football game, a passing yards data point may also correspond to a receiving yards data point.

The event algorithm can determine which event thresholds have been met to identify which events have occurred. For example, if an event threshold requires three data points and responsive to a first message, three data points have been grouped into the respective event threshold, the event algorithm can determine that the particular event has occurred. If an event threshold requires two data points and responsive to a first message, two data points have been grouped into the respective event threshold, the event algorithm can determine that the particular event has occurred. If an event threshold requires three data points and responsive to a first message, two data points have been grouped into the respective event threshold, the event algorithm can determine that the particular event has not occurred. The event algorithm can identify those events that have occurred responsive to each message of the sequence of messages that is received by the event generation system. For example, the event generation system can execute the event algorithm responsive to receiving one or more messages from the sequence of messages to transform the time based data into event based data. The event algorithm can provide the identified events having event data (e.g., a touchdown has occurred a completed pass has occurred) to the event generation system. The event generation system can use the event data corresponding to one or more events to generate the event cards.

In some embodiments, the event generation system, execute the event algorithm using time based data from the message of a sequence of messages from a content source. The event generation system can determine, using the event algorithm, one or more data points that changed value responsive to the time based data, the one or more data points corresponding to at least one event of the one or more events. The event generation system can convert, using the event algorithm, the time based data to event based data corresponding to the at least one event of the one or more events.

At BLOCK 1240, the event generation system can transmit at least one of the generated event cards to one or more remote devices for display in a content feed including a plurality of event cards corresponding to the game. Once the event card generator generates the event card, the event generation system can be configured to determine which devices to which to transmit the card. In some embodiments, the event generation system can be configured to transmit event cards to a remote device of a user responsive to either receiving a request from an application executing on the remote device of the user or determining that there is an active connection (for example, a web socket connection) established between the event generation system 805 and the remote device.

In some embodiments, the application to which to transmit the event card may have a configuration setting enabled on the application, which is communicated to the event generation system 805. The configuration setting can be set to indicate that a content filtering policy 374 should be applied. The content filtering policy 374 can be based on a list of players included in the player list of the user. The player list, such as the player list 362 shown in FIGS. 3 and 4, of the user can be dynamically updated as the user creates, removes or modifies one or more lineups at one or more fantasy sports systems 220. Moreover, as contests hosted by the fantasy sports systems 220 are completed, players included in lineups submitted for those contests can be removed from the player list of the user (assuming no other active lineup of the user includes the player being removed).

In some embodiments, the event generation system 805 can select one or more devices to which to transmit the content based on the players included in the event card. The event generation system 805 can be configured to determine a list of devices having an active connection with the event generation system 805 and determine, from this list of devices, a set of devices associated with player lists that include at least one player to which points are assigned for the event. Responsive to determining that one of the players to which the event card is assigning points to is included in the player list associated with the device, the event generation system 805 can determine to transmit the event card to the remote device.

In embodiments in which a remote device has not set a configuration setting for filtering content based on the player list of the device, the event generation system can transmit the event card to the remote device responsive to determining that an active connection with the device is present.

The event card can be received by the remote device and the application, such as the application 212 executing on the remote device, such as the device 210*a-n*, can be configured to display the event card in a content feed of the application. In some embodiments, the content feed can be configured to display all event cards relating to a particular sport. In some embodiments, the content feed can be configured to display event cards relating to a particular game. In some embodiments, the content feed can be configured to display event cards relating to players included in the player list of the user.

By displaying the event cards in the content feed of applications at remote devices of users, users are able to get real-time or near real-time, in-game updates on an event-by-event basis. Moreover, these events are specifically generated based on the assignment of points to one or more players. In this way, the event generation system 805 can be configured to only transmit content responsive to an event that includes a point assignment.

In some embodiments, the event generation system can identify a player list associated with a user of the event generation system. For example, the event generation system can maintain one more player lists (e.g., fantasy sports lineup) for each user. The player list can include a list of players the user has selected in one or more fantasy sports lineups submitted to a fantasy sports system. The event generation system can determine that a first event card of the generated event cards identifies a player included in the player list of the user. In some embodiments, the event generation system can determine that multiple event cards of the generated event cards identifies a player included in the player list of the user, identifies multiple players included in the player list of the user, and/or identifies multiple players included in multiple different player lists of the user. The event generation system can transmit the first event card to a remote device of the user responsive to determining that the player identified in the first event card is included in the player list of the user. The event generation system can transmit multiple event cards to one or more remote devices of the user responsive to determining that one or more players identified in the one or more event cards is included in one or more player lists of the user. The event generation system can determine that a second event card of the generated event cards does not identify any player included in the player list of the user. The event generation system can restrict transmission of the second event card to the remote device of the user responsive to determining that the second event card of the generated event cards does not identify any player included in the player list of the user.

The event generation system can maintain for each player, a points tally identifying a total number of points allocated to the player in the game. For example, for each player in one or more player lists of one or more users of the event generation system, the event generation system can maintain a points tally identifying a total number of points allocated to one or more players in one or more games. The event generation system can update, for each player to which points were assigned based on the one or more events identified in the message, the points tally by adjusting the points tally based on the amount of points assigned to the player for the one or more events identified in the message. In some embodiments, the event generation system can dynamically update the points tally responsive to receiving one or more messages from the sequence of messages. For example, the event generation system can dynamically update the points tally responsive to receiving one or more messages to provide live or substantially live scoring for one or more players of one or more players lists associated with one or more users of the event generation system.

In some embodiments, the message received can be a first message of the sequence of messages and the event generation system can receive a second message of the sequence of messages subsequent to the first message from a content source. The second message can identify information relating to a new game condition of the game. The event generation system can determine from the second message, the new game condition of the game. The event generation system can compare the game condition of the game with a previous game condition of the game determined based on the first message. For example, the event generation system can identify differences between the game condition and a previous game condition of the game to update or modify the game condition. The event generation system can determine one or more events that occurred in the game based on the content of the second message and the comparison. The event generation system can determine for each event of the one or more events relating to the second message, an event type and individual player contributions of one or more players. The event generation system can assign, for each event of the one or more events relating to the second message, to each player that contributed in the event, a points allocation corresponding to the player's contribution in the event based on the points assignment policy and the event type. The event generation system can generate respective event cards for the events for which points allocation were assigned to at least one player. For example, event cards can be generated for each event having an initial value, an update or modification to a score in the game and/or an update or modification to a points tally for one or more players in the game. The number of event cards generated can correspond to the number of events having initial values, updates or modifications. The event generation system can transmit at least one of the generated event cards to a subset of the one or more remote devices subsequent to transmitting the event cards corresponding to the first message.

In some embodiments, the event generation system can determine that a first event card of the generated event cards identifies a player included in a player list of a user of the event generation system. The event generation system can dynamically update the content feed of at least one remote device of the user with the first event card. For example, the event generation system can be executing on at least one remote device of the user. The event generation system can provide a content feed including content associated with one or more players from one or more players lists of the users. Responsive to one or more event cards being generated that include players from the one or more player lists of the users, the event generation system can provide, update or otherwise modify the content feed of at least one remote device of the user to display or reflect the new data included in the one or more event cards generated. The event generation system can determine that a first event card of the generated event cards identifies a first player included in a first player list of a first user of the event generation system and a second player included in a second list of a second user of the event generation system. The event generation system can assign to the first player included in a first player list a first points allocation corresponding to the first player's contribution in the event and assign to the second player included in the second player list a second points allocation corresponding to the second player's contribution in the event. In some embodiments, the event generation system can dynamically update the content feed of at least one remote device of the first user with the first event card and dynamically update the content feed of at least one remote device of the second user with the first event card.

In some embodiments, the message received can be a first message of the sequence of messages and the event generation system can receive a second message of the sequence of messages subsequent to the first message from a content source or multiple messages of the sequence of messages subsequent to the first message from a content source. The second message or other subsequent messages can identify information relating to a new game condition of the game. The event generation system can dynamically modify the number of points in the points allocation assigned to a first player that contributed in the event responsive to the second message and dynamically modify the number of points in the points allocation assigned to a second player that contributed in the event responsive to the second message.

In some embodiments, the event generation system can dynamically modify the game condition of a first event card for a first user event generation system responsive to a second message of the sequence of messages and dynamically modify the game condition of the first event card for the first user event generation system responsive to a third message of the sequence of messages, the third message subsequent to the second message of the sequence of messages. For example, the event generation system can provide live updates for one or more event cards or generate new event cards responsive to one or more messages from the sequence of messages. The event generation system can continuously update or otherwise modify event data, game data, and/or player date responsive to receiving one or more messages from the sequence of messages.

FIGS. 13A-13F are screenshots of user interfaces of the application shown in FIG. 2 generated using information provided by the event generation system shown in FIG. 8.

Figures 14C, 14D:
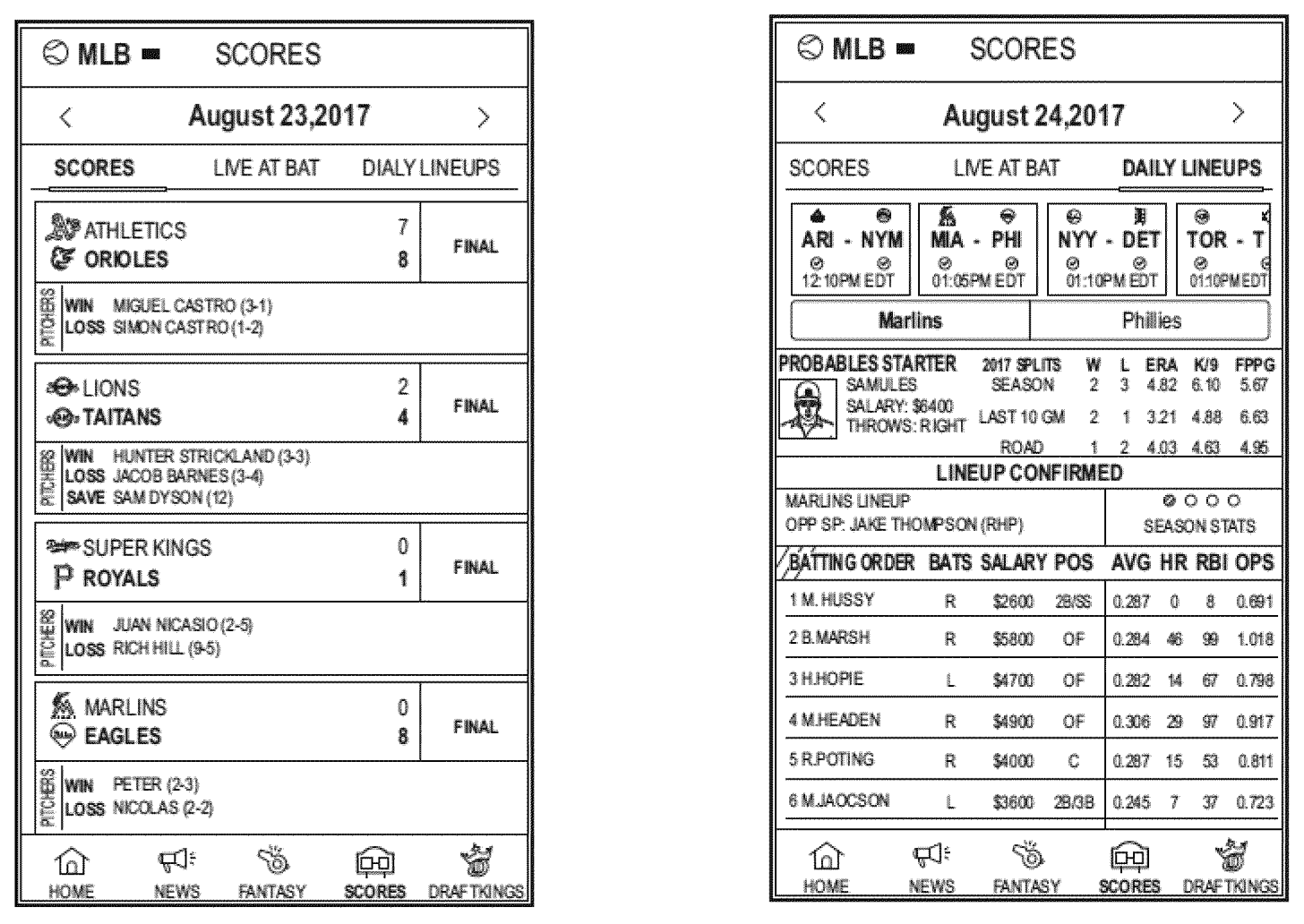
Figures 14E, 14F:
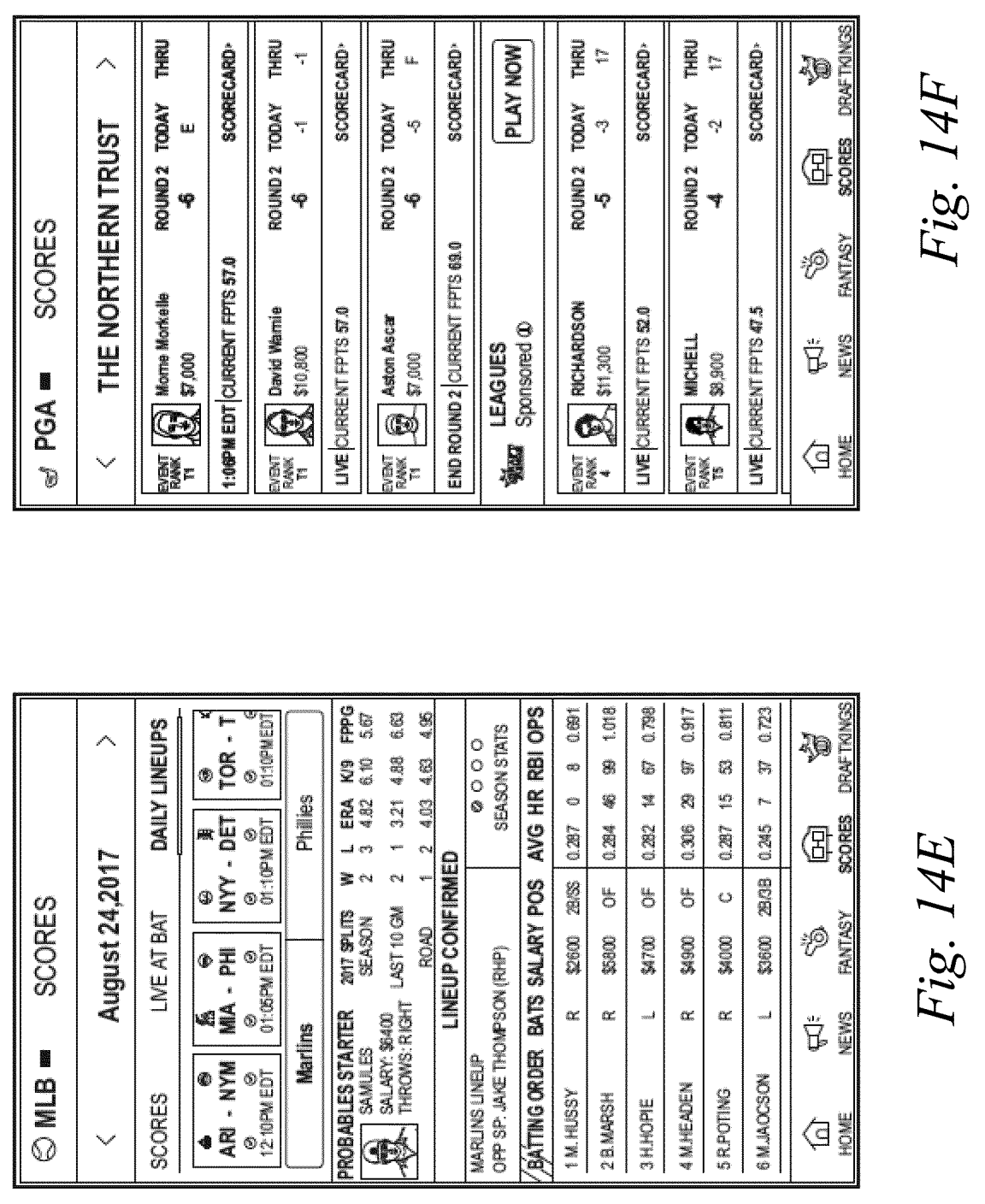
Figures 14I, 14J:
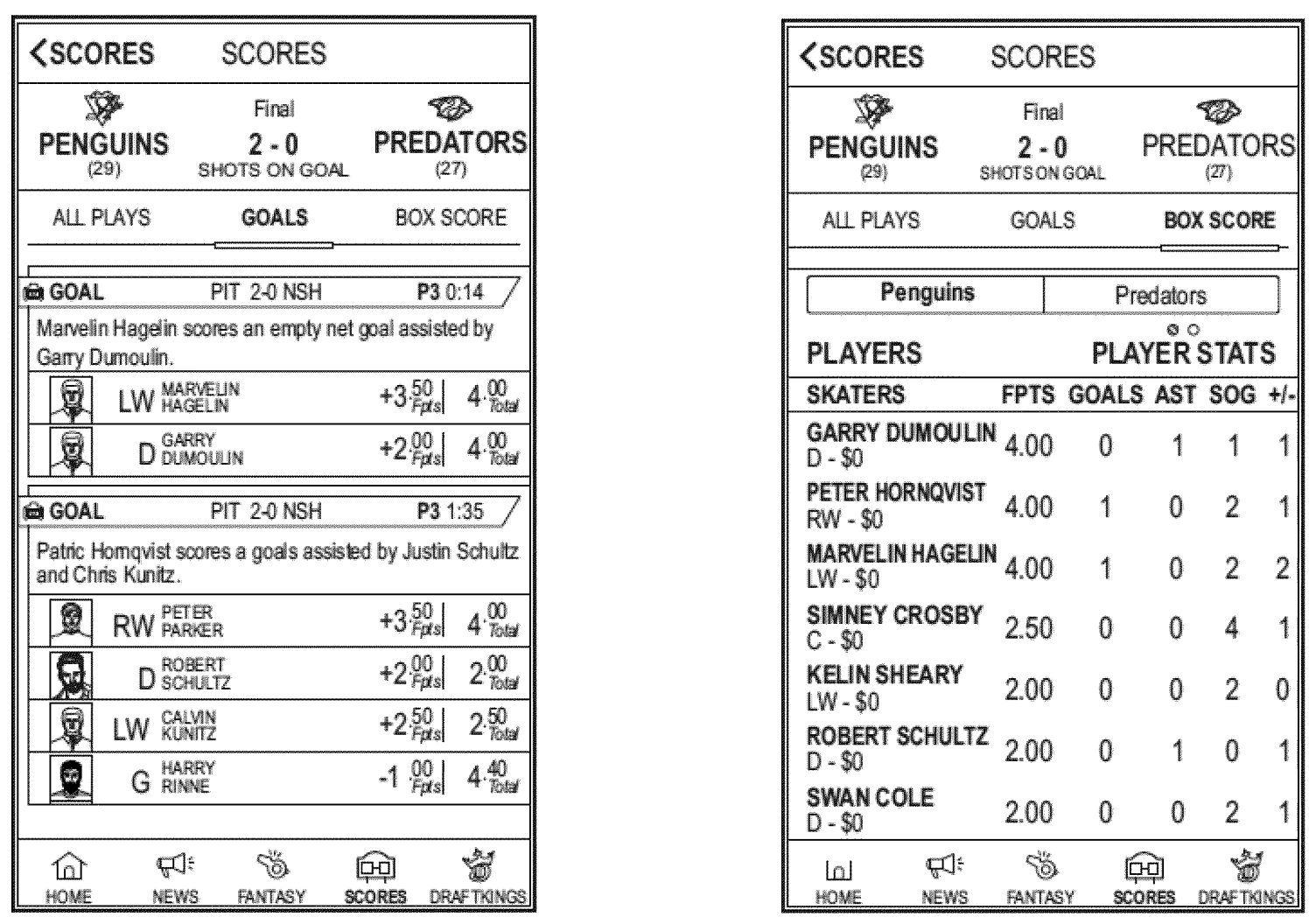

FIGS. 14A-14J are screenshots of user interfaces of the application shown in FIG. 2 generated using information provided by the event generation system shown in FIG. 8.

It should be appreciated that although the specification and claims refer to fantasy sports, the application is not limited to fantasy sports. Rather, the scope of the application may extend to other contexts where real-time events are received in a message stream and can be enhanced using information received from one or more other systems.

While the disclosure has been described with respect to specific embodiments, one skilled in the art will recognize that numerous modifications are possible. Embodiments of the disclosure can be realized using a variety of computer systems and communication technologies including but not limited to specific examples described herein.

Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed:

1. A method, comprising:
  maintaining, by one or more processors coupled to memory, a plurality of player lists respectively corresponding to a plurality of users respectively operating a plurality of remote devices;
  detecting, by the one or more processors, an occurrence of a first event that occurred during a live sporting event;
  responsive to detecting the occurrence of the first event:
    (i) assigning, by the one or more processors, to each player that contributed to the first event, a respective value corresponding to a contribution of the player to the occurrence of the first event based on an assignment policy, and
    (ii) determining, by the one or more processors, that a first event card for a first player included in a subset of the plurality of player lists is to be generated based on the first player having contributed to the occurrence of the first event;
  responsive to determining that the first event card is to be generated, generating, by the one or more processors, the first event card to include an indication of the first event that occurred during the live sporting event, a first identifier of the first player, and the respective value corresponding to the contribution of the first player to the occurrence of the first event;

transmitting, by the one or more processors, responsive to generating the first event card, information of the first event card for the first event to a subset of the plurality of remote devices of a subset of the plurality of users respectively corresponding to the subset of the plurality of player lists, the information of the first event card provided for display in a content feed including a plurality of event cards;

detecting, by the one or more processors, an occurrence of a second event that occurred during the live sporting event;

generating, by one or more processors, for the second event, a second event card including an indication of the second event, a second identifier of a second player, and a respective value corresponding to a contribution of the second player to the occurrence of the second event; and restricting, by the one or more processors, transmission of the second event card to a first remote device of the subset of the plurality of remote devices of the subset of the plurality of users based on determining that the first remote device has enabled a setting corresponding to a content filtering policy to restrict receiving or presenting event cards identifying players not included in a player list of the first user, wherein the second player is not included in the player list of the first user.

2. The method of claim 1, wherein the first event card further includes one or more of i) an identifier identifying the live sporting event, ii) a game condition of the live sporting event, iii) a respective identifier of each player that contributed to the first event, iv) the respective value assigned to each player that contributed to the first event, or v) a total number of points allocated to each player.

3. The method of claim 1, wherein detecting the occurrence of the event that occurred in the live sporting event comprises:

receiving, by the one or more processors, a message of a sequence of messages from a content source; and detecting, by the one or more processors, the occurrence of the first event based on the message.

4. The method of claim 3, further comprising receiving, by the one or more processors, a second message of the sequence of messages at least a predetermined amount of time after the message, the predetermined amount of time based in part on an event type indicated in the message.

5. The method of claim 1, further comprising updating, by the one or more processors, a game condition of the live sporting event responsive to detecting the first event.

6. The method of claim 1, further comprising determining, by the one or more processors, an event type of the event based on a comparison between the first event and one or more sample events.

7. The method of claim 1, further comprising determining, by the one or more processors, the contribution of the first player based on a comparison of statistics of the first player and statistics of each player that contributed to one or more previous events.

8. A system, comprising:
one or more processors coupled to memory, the one or more processors configured to:

maintain a plurality of player lists respectively corresponding to a plurality of users respectively operating a plurality of remote devices;

detect an occurrence of a first event that occurred during a live sporting event;

responsive to detecting the occurrence of the first event:
(i) assign, to each player that contributed to the first event, a respective value corresponding to a contribution of the player to the occurrence of the first event based on an assignment policy, and
(ii) determine that a first event card for a first player included in a subset of the plurality of player lists is to be generated based on the first player having contributed to the occurrence of the first event;

responsive to determining that the first event card is to be generated, generate the first event card to include an indication of the first event that occurred during the live sporting event, an identifier of the first player and the respective value corresponding to the contribution of the first player to the occurrence of the first event;

transmit, responsive to generating the first event card, information of the first event card for the event to a subset of the plurality of remote devices of a subset of the plurality of users respectively corresponding to the subset of the plurality of player lists, the information of the first event card provided for display in a content feed including a plurality of event cards;

detect an occurrence of a second event that occurred during the live sporting event;

generate for the second event, a second event card including an indication of the second event, a second identifier of a second player, and a respective value corresponding to a contribution of the second player to the occurrence of the second event; and restrict transmission of the second event card to a first remote device of the subset of the plurality of remote devices of the subset of the plurality of users based on determining that the first remote device has enabled a setting corresponding to a content filtering policy to restrict receiving or presenting event cards identifying players not included in a player list of the first user, wherein the second player is not included in the player list of the first user.

9. The system of claim 8, wherein the first event card further includes one or more of i) an identifier identifying the live sporting event, ii) a game condition of the live sporting event, iii) a respective identifier of each player that contributed to the first event, iv) the respective value assigned to each player that contributed to the first event, or v) a total number of points allocated to each player.

10. The system of claim 8, wherein the one or more processors are further configured to detect the occurrence of the first event that occurred in the live sporting event by performing operations comprising:

receiving a message of a sequence of messages from a content source; and detecting the occurrence of the first event based on the message.

11. The system of claim 10, wherein the one or more processors are further configured to receive a second message of the sequence of messages at least a predetermined amount of time after the message, the predetermined amount of time based in part on an event type indicated in the message.

12. The system of claim 8, wherein the one or more processors are further configured to update a game condition of the live sporting event responsive to detecting the first event.

13. The system of claim 8, wherein the one or more processors are further configured to determine an event type of the first event based on a comparison between the first event and one or more sample events.

14. The system of claim 8, wherein the one or more processors are further configured to determine the contribution of the first player based on a comparison of statistics of the first player and statistics of each player that contributed to one or more previous events.

\* \* \* \* \*